(12) United States Patent
Yoshimura et al.

(10) Patent No.: US 7,062,559 B2
(45) Date of Patent: Jun. 13, 2006

(54) COMPUTER RESOURCE ALLOCATING METHOD

(75) Inventors: Yutaka Yoshimura, Kawasaki (JP); Toshiaki Tarui, Sagamihara (JP); Frederico Buchholz Maciel, Kokubunji (JP); Toru Shonai, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 689 days.

(21) Appl. No.: 10/080,715

(22) Filed: Feb. 25, 2002

(65) Prior Publication Data

US 2003/0069972 A1    Apr. 10, 2003

(30) Foreign Application Priority Data

Oct. 10, 2001   (JP)   ............................. 2001-312115

(51) Int. Cl.
*G06F 15/16*    (2006.01)
(52) U.S. Cl. ........................... 709/226; 709/224
(58) Field of Classification Search ................. 709/226
See application file for complete search history.

(56) References Cited

U.S. PATENT DOCUMENTS

| 6,597,956 | B1 * | 7/2003 | Aziz et al. | 700/3 |
| 6,662,221 | B1 * | 12/2003 | Gonda et al. | 709/223 |
| 6,779,016 | B1 * | 8/2004 | Aziz et al. | 709/201 |
| 2002/0174211 | A1 * | 11/2002 | Ishizaki et al. | 709/223 |
| 2003/0055933 | A1 * | 3/2003 | Ishizaki et al. | 709/223 |

OTHER PUBLICATIONS

IEEE Standards for Local and Metropolitan Area Networs: Virtual Bridged Local Area Networks; IEEE Std 802.1Q-1998 (section 9).*

Erwin, Mike et al; "Virtual Private Networks, 2nd Edition"; Dec. 1998; O'Reilly.*
Alteon (Nikkei Open Systems 1999. 12 No. 81 pp. 128-131).
Hitachi (HITAC Manual 8080-2-148-60).
FC zoning (SAN published by Piason Education, pp. 85-86).
VPN (VPN/VLAN text published by Ascii Corp., pp. 7-30).

* cited by examiner

*Primary Examiner*—William C. Vaughn, Jr.
(74) *Attorney, Agent, or Firm*—Mattingly, Stanger, Malur, Brundidge, P.C.

(57) ABSTRACT

When a load of a user is fluctuated, a data center dynamically changes resource allocation to the user according to the load and holds security for each user.

A control program on a data center managing server creates a VLAN configuration table so as to allocate a user-dedicated VLAN including plural network switches for each user company, thereby configuring the ports of a load balancer and network switches allocated to a user to the user-dedicated VLAN. A VPN is configured from the user to the data center, whereby a VLAN tagging technique is used to hold security of the user from the user to the data center. The control program compares a user condition setting table created along the service level agreement for each user with the monitoring result of the computer operating state (the CPU utilization history in a VLAN operation table) to dynamically change the computer allocation and VLAN configuration at unsatisfied agreement. Specifically, the VLAN configuration table and the VLAN operation table are changed to change the VLAN configuration in the load balancer and the network switches (in the case of the Web layer). The control program changes the parameter (the sever allocation history in the VLAN operation table) related to charge information based on that.

7 Claims, 29 Drawing Sheets

FIG. 6

LOAD BALANCER ADDRESS CORRESPONDENCE TABLE — T00

| UID | VIRTUAL addr | REAL addr |
|---|---|---|
| #0 | a100 | a10 |
| #1 | b100 | b10 |

VLAN STRUCTURE TABLE — T02

| UID | VLAN# | WEB SERVER | AP SERVER | DB SERVER | PORT#(LB01) | PORT#(SW01) | PORT#(SW02) | SECURITY SERVICE |
|---|---|---|---|---|---|---|---|---|
| #0 | 0 | a10 | a20 | a30 | p000, p001 | p101, p201 | p301, p401 | ○ |
| #1 | 1 | b10 | b20 | b30 | p000, p002 | p102, p202 | p302, p402 | ○ |

USER CONDITION SETTING TABLE — T01

| | VLAN-RELATED | | | | | VPN-RELATED | | | | STORAGE NETWORK-RELATED | | | |
|---|---|---|---|---|---|---|---|---|---|---|---|---|---|
| UID | SERVER TYPE | CPU UTILIZATION | LOWER LIMIT OF NUMBER OF UNITS | UPPER LIMIT OF NUMBER OF UNITS | SECURITY SERVICE | MINIMUM BANDWIDTH | MAXIMUM BANDWIDTH | BANDWIDTH UTILIZATION | GUARANTEE BANDWIDTH | LUN ACCESS PRIORITY | NETWORK MINIMUM BANDWIDTH | NETWORK MAXIMUM BANDWIDTH | BANDWIDTH UTILIZATION |
| #0 | WEB SERVER | BELOW 50% | ONE | SIX | ○ | 1.5Mbps | 5Mbps | 40% | 1.5Mbps | 1 | 1.5Mbps | 5Mbps | 40% |
| | AP SERVER | BELOW 50% | ONE | SIX | | | | | | | | | |
| | DB SERVER | BELOW 50% | ONE | SIX | | | | | | | | | |
| #1 | WEB SERVER | BELOW 50% | ONE | SIX | ○ | 1.5Mbps | 3Mbps | 40% | | 2 | 1.5Mbps | 3Mbps | 40% |

SERVER AND VLAN OPERATION TABLE — T03

| | | | CPU UTILIZATION HISTORY | | | | SERVER ALLOCATION HISTORY | | | |
|---|---|---|---|---|---|---|---|---|---|---|
| UID | VLAN# | ALLOCATED SERVER | BELOW 50% | ABOVE 50% | TWO | SIX | RESOURCE SHORTAGE | CONTRACT CONDITION EXCESS | CHARGE |
| #0 | 0 | WEB | 74h | 26h | 15h | 18h | 13h | 3h | 2M¥ |
| | | AP | 68h | 32h | 25h | 20h | 3h | 5h | |
| | | DB | 72h | 28h | 15h | 16h | 2h | 4h | |
| #1 | 1 | WEB | 114h | 26h | 24h | 26h | 4h | 3h | 1M¥ |

P10 CONTROL PROGRAM — CONTROL UNIT — U10

USER CONDITION SETTING TABLE

| UID | SERVER TYPE | VLAN-RELATED ||||| VPN-RELATED |||| STORAGE NETWORK-RELATED ||||
|---|---|---|---|---|---|---|---|---|---|---|---|---|---|---|
| | | CPU UTILIZATION | LOWER LIMIT OF NUMBER OF UNITS | UPPER LIMIT OF NUMBER OF UNITS | SECURITY SERVICE | MINIMUM BANDWIDTH | MAXIMUM BANDWIDTH | BANDWIDTH UTILIZATION | GUARANTEE BANDWIDTH | LUN ACCESS PRIORITY | NETWORK MINIMUM BANDWIDTH | NETWORK MAXIMUM BANDWIDTH | BANDWIDTH UTILIZATION |
| #0 | WEB SERVER | BELOW 50% | ONE | SIX | ○ | 1.5Mbps | 5Mbps | 40% | 1.5Mbps | 1 | 1.5Mbps | 5Mbps | 40% |
| | AP SERVER | BELOW 50% | ONE | SIX | | | | | | | | | |
| | DB SERVER | BELOW 50% | ONE | SIX | | | | | | | | | |
| #1 | WEB SERVER | BELOW 50% | ONE | SIX | ○ | 1.5Mbps | 3Mbps | 40% | | 2 | 1.5Mbps | 3Mbps | 40% |
| .. | .. | .. | .. | .. | .. | .. | .. | .. | .. | .. | .. | .. | .. |

~T01

VPN SETTING

| UID | BANDWIDTH UTILIZATION | MINIMUM BANDWIDTH | MAXIMUM BANDWIDTH | GUARANTEE BANDWIDTH | CURRENT USE BANDWIDTH |
|---|---|---|---|---|---|
| #0 | 40% | 1.5Mbps | 5Mbps | 1.5Mbps | 1.5Mbps |
| #1 | 40% | 1.5Mbps | 3Mbps | | 1.5Mbps |
| .. | .. | .. | .. | .. | .. |

~T04

VPN OPERATING STATE

| UID | VPN ROUTER | BANDWIDTH UTILIZATION || ALLOCATED BANDWIDTH HISTORY |||||| CHARGE |
|---|---|---|---|---|---|---|---|---|---|---|
| | | BELOW 40% | ABOVE 40% | 1.5Mbps | ... | 5Mbps | RESOURCE SHORTAGE | CONTRACT CONDITION EXCESS | | |
| #0 | USER | 60h | 40h | 14h | ... | 52h | 2h | 14h | | 0.5M¥ |
| | CARRIER | 55h | 45h | 13h | ... | 53h | 3h | 12h | | |
| | DATA CENTER | 63h | 37h | 15h | ... | 52h | 4h | 10h | | |
| #1 | USER | 67h | 33h | 14h | ... | — | 3h | 4h | | 0.5M¥ |
| .. | .. | .. | .. | .. | .. | .. | .. | .. | | .. |

~T05

P10 — CONTROL PROGRAM

U10 — CONTROL UNIT

L01, L10, L20

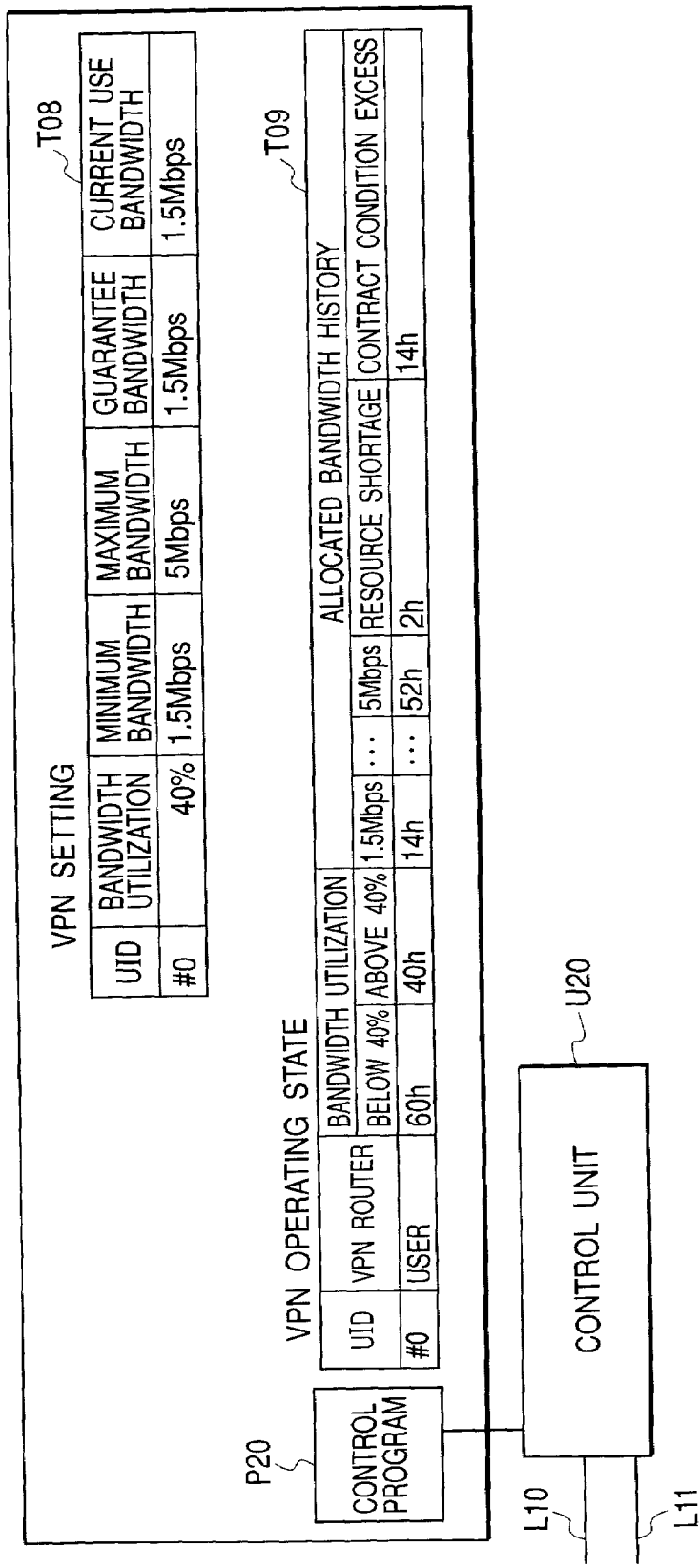

SERVICE LEVEL CONDITION INPUT SCREEN (OPTION SELECTION)

SECURITY OPTION SERVICE

· USER-DEDICATED VLAN AND VPN CONFIGURATION

NOT REQUIRED ☐   REQUIRED ☑

RELIABILITY OPTION SERVICE

· NETWORK BANDWIDTH GUARANTEE CONFIGURATION

NOT REQUIRED ☐   REQUIRED ☑

SERVICE LEVEL CONDITION INPUT SCREEN

REPRESENTATIVE ADDRESS [ a100 ]

| USE SERVER TYPE | | NUMBER OF SERVERS | | USE CONDITION | |
|---|---|---|---|---|---|
| | | LOWER LIMIT | UPPER LIMIT | CPU UTILIZATION | · · |
| WEB SERVER | ☑ | ONE | SIX | BELOW 50% | |
| AP SERVER | ☑ | ONE | SIX | BELOW 50% | |
| DB SERVER | ☑ | ONE | SIX | BELOW 50% | |

U03

☑ VPN OPTION
(FILL IN IF SELECTED)

NETWORK BANDWIDTH
MINIMUM [1.5] Mbps   MAXIMUM [5] Mbps

USE CONDITION
BANDWIDTH UTILIZATION [BELOW 40%]

STORAGE NETWORK BANDWIDTH
MINIMUM [1.5] Mbps   MAXIMUM [5] Mbps

USE CONDITION
BANDWIDTH UTILIZATION [BELOW 40%]

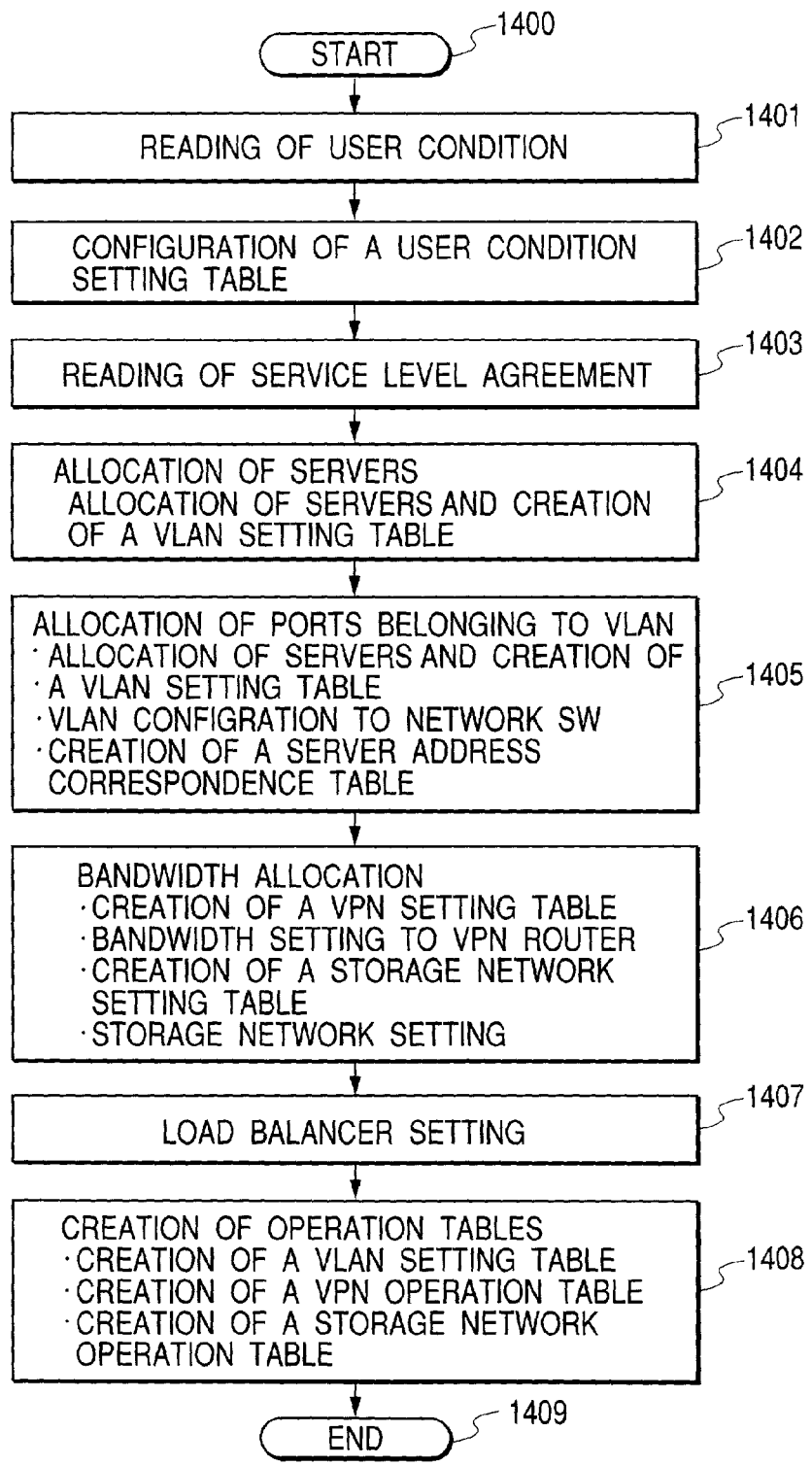

FIG. 18

SERVICE LEVEL CONDITION INPUT SCREEN (OPTION SCREEN) (U05)

SECURITY OPTION SERVICE

· USER-DEDICATED VLAN AND VPN CONFIGURATION — NOT REQUIRED ☐   REQUIRED ☑

RELIABILITY OPTION SERVICE

· NETWORK BANDWIDTH GUARANTEE CONFIGURATION — NOT REQUIRED ☐   REQUIRED ☑

FIG. 19

SERVICE LEVEL CONDITION INPUT SCREEN (U06)

ADDRESS  WEB [a100]   AP [a200]   DB [a300]

USE SERVER TYPE | ALLOCATION (PERCENTAGE) OF CPU | USE CONDITION

| USE SERVER TYPE | | LOWER LIMIT | UPPER LIMIT | CPU UTILIZATION | |
|---|---|---|---|---|---|
| WEB SERVER | ☑ | 20 % | 70 % | BELOW 50% | |
| AP SERVER | ☑ | 20 % | 70 % | BELOW 50% | |
| DB SERVER | ☑ | 20 % | 70 % | BELOW 50% | |

(U07) ☑ VPN OPTION (FILL IN IF SELECTED)

NETWORK BANDWIDTH   MINIMUM [1.5] Mbps   MAXIMUM [5] Mbps
USE CONDITION  BANDWIDTH UTILIZATION  [BELOW 40%]

STORAGE NETWORK BANDWIDTH   MINIMUM [1.5] Mbps   MAXIMUM [5] Mbps
USE CONDITION  BANDWIDTH UTILIZATION  [BELOW 40%]

FIG. 21

USER CONDITION SETTING TABLE

| UID | SERVER TYPE | VLAN-RELATED ||||| VPN-RELATED |||| STORAGE NETWORK-RELATED |||| T21 |
|---|---|---|---|---|---|---|---|---|---|---|---|---|---|---|
| | | CPU UTILIZATION | LOWER LIMIT OF ALLOCATION (PERCENTAGE) OF CPU UTILIZATION | UPPER LIMIT OF ALLOCATION (PERCENTAGE) OF CPU UTILIZATION | SECURITY SERVICE | MINIMUM BANDWIDTH | MAXIMUM BANDWIDTH | BANDWIDTH UTILIZATION | GUARANTEE BANDWIDTH | LUN ACCESS PRIORITY | NETWORK MINIMUM BANDWIDTH | NETWORK MAXIMUM BANDWIDTH | BANDWIDTH UTILIZATION ||
| #0 | WEB SERVER | BELOW 50% | 20% | 70% | ○ | 1.5Mbps | 5Mbps | 40% | 1.5Mbps | 1 | 1.5Mbps | 5Mbps | 40% ||
| | AP SERVER | BELOW 50% | 20% | 70% | | | | | | | | | ||
| | DB SERVER | BELOW 50% | 20% | 70% | | | | | | | | | ||
| #1 | WEB SERVER | BELOW 50% | 20% | 70% | ○ | 1.5Mbps | 3Mbps | 40% | | 2 | 1.5Mbps | 3Mbps | 40% ||
| .. | .. | .. | .. | .. | .. | .. | .. | .. | .. | .. | .. | .. | .. ||

VPN SETTING    T25

| UID | BANDWIDTH UTILIZATION | MINIMUM BANDWIDTH | MAXIMUM BANDWIDTH | GUARANTEE BANDWIDTH | CURRENT USE BANDWIDTH |
|---|---|---|---|---|---|
| #0 | 40% | 1.5Mbps | 5Mbps | 1.5Mbps | 1.5Mbps |
| #1 | 40% | 1.5Mbps | 3Mbps | | 1.5Mbps |
| .. | .. | .. | .. | .. | .. |

VPN OPERATING STATE    T26

| UID | VPN ROUTER | BANDWIDTH UTILIZATION ||| ALLOCATED BANDWIDTH HISTORY ||| CONTRACT CONDITION EXCESS | CHARGE |
|---|---|---|---|---|---|---|---|---|---|
| | | BELOW 40% | ABOVE 40% | 1.5Mbps | 5Mbps | RESOURCE SHORTAGE | | | |
| #0 | USER | 60h | 40h | 14h | 52h | 2h | | 14h | 0.5M¥ |
| | CARRIER | 55h | 45h | 13h | 53h | 3h | | 12h | |
| | DATA CENTER | 63h | 37h | 15h | 52h | 4h | | 10h | |
| #1 | USER | 67h | 33h | 14h | — | 3h | | 4h | 0.5M¥ |
| .. | .. | .. | .. | .. | .. | .. | | .. | .. |

P10 CONTROL PROGRAM

U10 CONTROL UNIT

L01 L10 L20

COMPUTER RESOURCE ALLOCATING METHOD

FIELD OF THE INVENTION

The present invention relates to a method for dividing and allocating resources in a computer system to each user, and more specifically to a resource allocating method which, when processing a request of plural users in a system having a plurality of computers interconnected by a network, provides in real time a computer resource necessary to maintain an agreement with respect to the service contents previously arranged with each user and holds security between users.

BACKGROUND OF THE INVENTION

To reduce cost of an information department, a business form to outsource in-company information system operation and company home page management to an ASP (Application Service Provider) is on the increase. There are many forms in such a manner that the ASP outsources computer resource supply and operating management to a data center operator.

The data center operator prepares a great number of computer resources which are divided to plural user companies for use so as to reduce its own operating cost and supply a service at low cost to the user companies. To hold security between the user companies, generally, different computer resources and storage resources are often allocated to each of the user companies.

Since a load of the user company is fluctuated depending on time and season, there are many agreement forms to increase or decrease allocated resources according to the load. In particular, when undertaking company home page management, it is difficult to predict a load due to access from an indefinite number of consumers via the Internet. For this, the user company side makes an agreement with the data center operator so as to increase for a certain period a predetermined number of computer resources by predicting load increase, for example, in a new product presentation. The data center operator allocates the increased computer resources to another user company for another period so as to make effective use of the resources. To facilitate such configuration change, the data center is configured so that a load balancer is arranged before plural computer resources to allow a user company A to use the computer resources for a certain period and to allow a user company B to use them for another period. An example of the load balancer includes ACE director produced by Alteon (Nikkei Open Systems 1999. 12 no. 81 pp. 128–131). The load balancer is manually configured based on the above agreement. When the storage resource must be increased, the storage contents must be duplicated.

Since the data center supplies different computer resources to many user companies, a great number of computer resources must be managed, resulting in increased managing cost. It can be considered a method in which a small number of computer resources each having high performance, for example, high multiplex SMP computers are introduced and controlled so that plural user companies share them. To hold security between the user companies, the function of a virtual computer is used. An example of the virtual computer includes a processor resource division managing function PRMF manufactured by Hitachi (HITAC Manual 8080-2-148-60). In the PRMF, plural OSes (operating systems) are operated on one computer, and an independent resource, e.g., a main memory or network adapter is allocated to each OS. Since a resource is not shared between the OSes, security between programs of different user companies executed on different OSes can be held. The PRMF is configured so as to control CPU resource percentage allocated to each OS. Only previously planned percentage change is enabled.

In general, the data center is used by plural users. A technique to hold security to maintain data independence for each user is considered. As the currently-known main security technique, VLAN (VPN/VLAN text published by Ascii Corp., pp. 31–42), VPN (VPN/VLAN text published by Ascii Corp., pp. 7–30), and FC zoning (SAN published by Piason Education, pp. 85–86) are known. The VLAN and the FC zoning techniques realize logically grouped networks which disable access to each other. The VPN is a technique to hold security for a user by encryption and packet priority control. The VPN can also guarantee a network use bandwidth. The zoning technique can control access to the storage at the port of a storage network switch allocated to the user. For example, a user A can cope with an increased load by incrementing the access priority so as to increase access to an LUN three times in every ten access times of the user to the storage to access to the LUN five times in every ten times. The security technique allows the user to access to and use user-dedicated data in the computer resource in the data center without anxiety of security. The network manager typically plans and statically configures a VLAN, VPN and FC zoning, and does not change the configuration when not required.

Finally, making of a service level agreement between the ASP, ISP (Internet Service Provider) and user is being typical. A service level guarantee agreement including connectability, availability, and latency performance is made. There are many forms to make a compensating agreement at an unsatisfied guarantee level.

The above prior art has the following problems.

In a method for manually configuring a load balancer and a network switch based on an agreement, it is difficult to cope with in real time abrupt load fluctuation which can not be predicted on the user company side. This is the same for the case of allocating different computers between users and the case of using a virtual computer. Further, the network mangers of both the user and the data center expend enormous efforts for system extension and holding of user's network security. In an environment to dynamically change a network configuration by load fluctuation, it is difficult to always manually manage the user's security.

SUMMARY OF THE INVENTION

An object of the present invention is to provide a method for holding user's security and reducing the load of the managers of a data center and a user even when a network is changed dynamically. Another object of the present invention is to provide a method for changing a network configuration so as to correspond to the user's load peak while holding the user's security when a network is changed dynamically and to hold a communication bandwidth only for the agreement contents made with the user to maintain quality of a web service to the user.

The present invention prepares a user identification table and VPN, VLAN and storage network configuration definition tables which are managed in a managing server. A user company is specified in the user identification table from a user request packet to a data center. On the other hand, a set of computers to execute a process to each user is defined in the VLAN configuration definition table, which is then configured in a load balancer and a network switch. The load balancer selects any one from the set of computers configured to execute a user request. When there are plural load balancers, the managing server controls this table to be matched between the load balancers. The managing server monitors the network bandwidth and configuration and the operating state of each computer to check if a service level agreement is satisfied. If necessary, the network bandwidth and the computer resources are decreased or increased to be matched with the agreement contents with the user and to change the VLAN configuration of the user for holding security. Specifically, the network configuration definition table of the set of computers is changed to be re-configured for the load balancer and the network switch. The managing server creates histories of the computer resource amount allocated to the user and of whether the service level agreement is followed and creates charge information.

Another embodiment of the present invention configures a data center with computers having a virtual computer mechanism. A virtual computer mechanism controlled by one OS is given to each user company. A managing server dynamically configures allocation of CPU time division utilization of each computer mechanism for the network bandwidth and each computer for each user company. The managing server monitors the network bandwidth and the operating state of each computer to check if the service level agreement is satisfied. If necessary, the network bandwidth and the allocation of CPU time division utilization are decreased or increased.

BRIEF DESCRIPTION OF THE DRAWINGS

FIG. 6 is a list of VLAN-related information held by the data center managing server of FIG. 2;

FIG. 7 is a list of VPN-related information held by the data center managing server of FIG. 2;

FIG. 8 is a list of VPN-related information held by a user bandwidth managing server;

FIG. 12 is a service level agreement input screen (option selection screen);

FIG. 13 is a service level agreement input screen (for setting the detail of a user condition);

FIG. 14 is a flowchart of initial allocation of the server, VLAN and VPN of the data center of FIG. 2;

FIG. 18 is a service level agreement input screen (option selection screen);

FIG. 19 is a service level agreement input screen (for setting the detail of a user condition);

FIG. 21 is a list of VPN-related information held by the data center managing server of FIG. 17;

DESCRIPTION OF THE PREFERRED EMBODIMENTS

Embodiments of the present invention will be described hereinbelow with reference to the drawings.

[1] First Embodiment

First, main drawings necessary to describe the embodiment will be explained.

Figure 1:
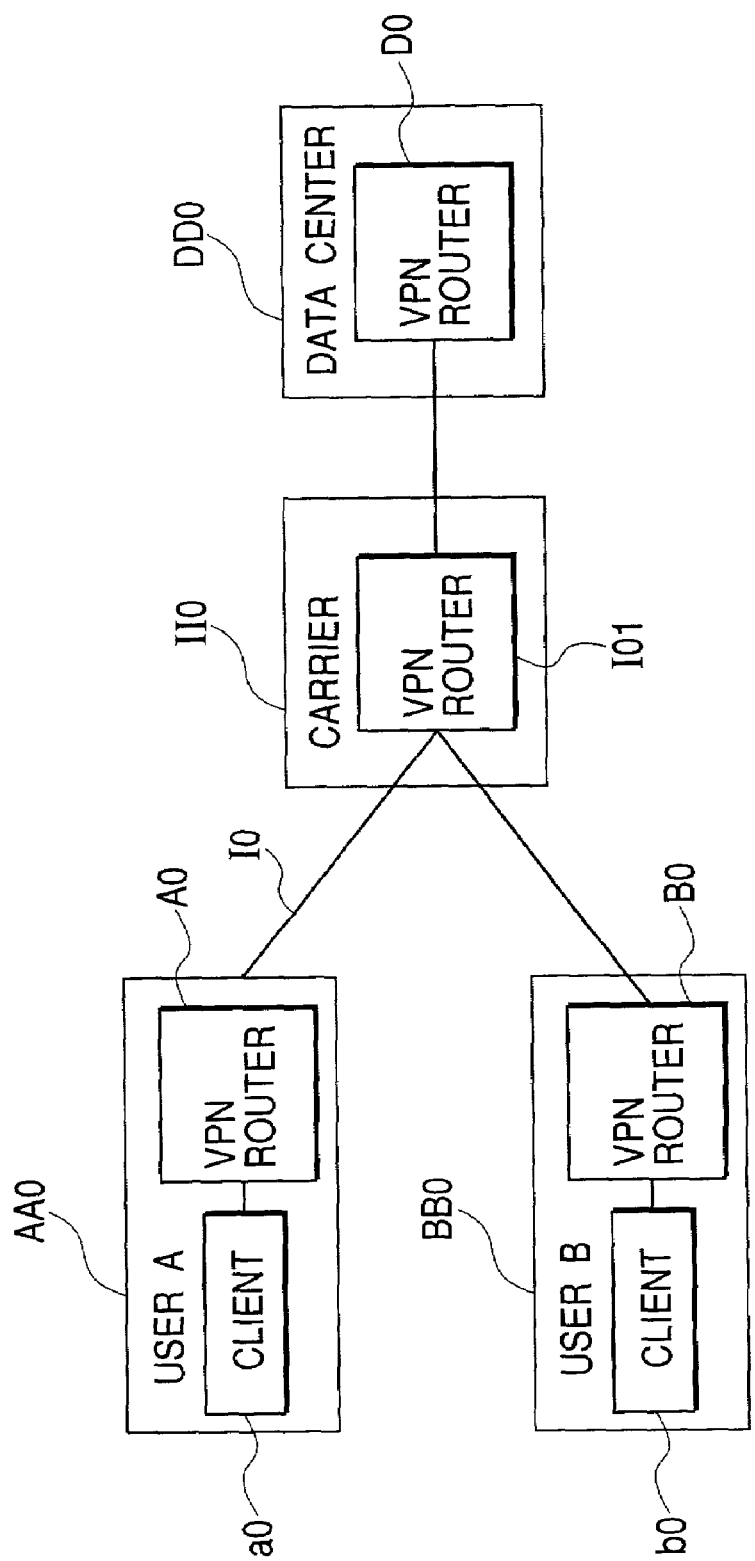
FIG. 1 is an example of a data center and a user connected via the Internet.
Figure 2:
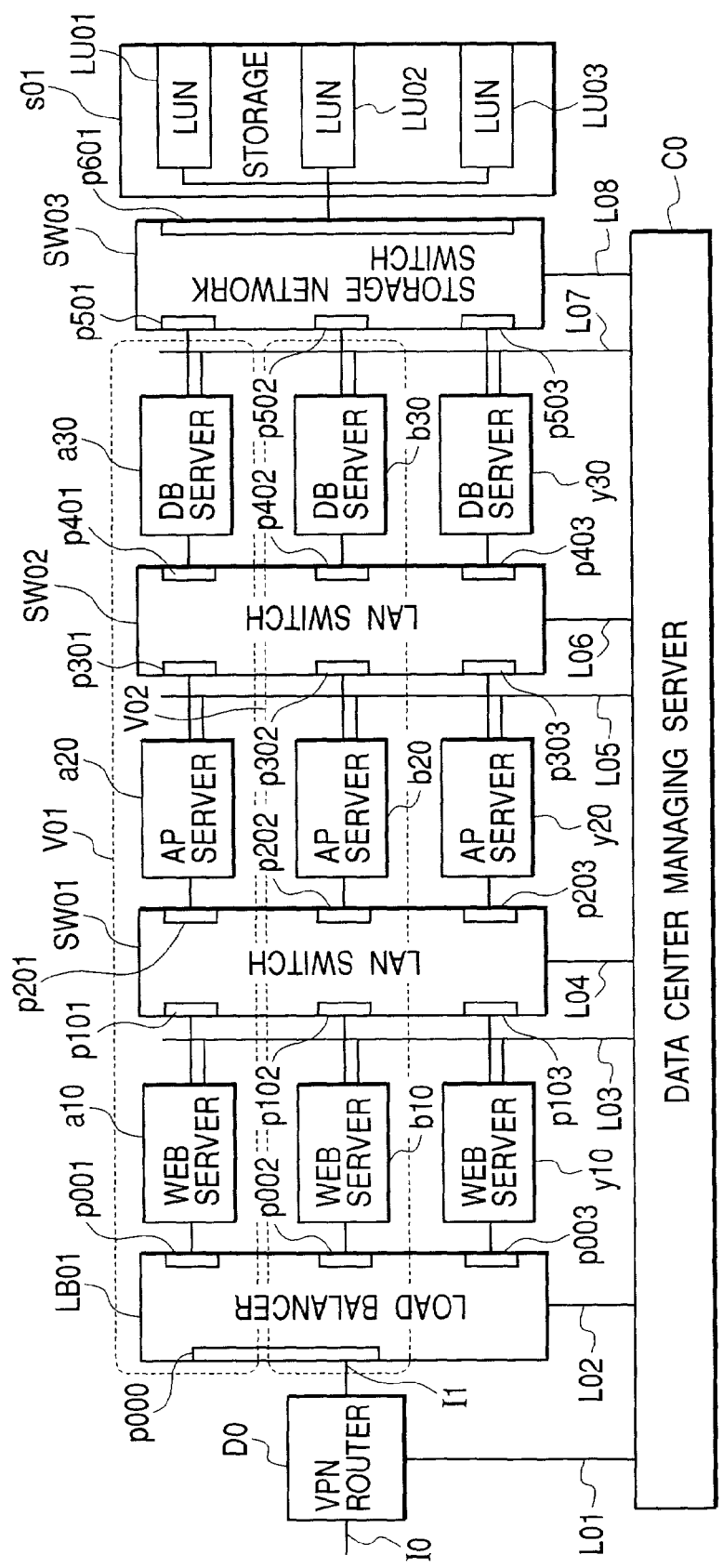
FIG. 2 is an example of the configuration of the data center.
Figure 3:
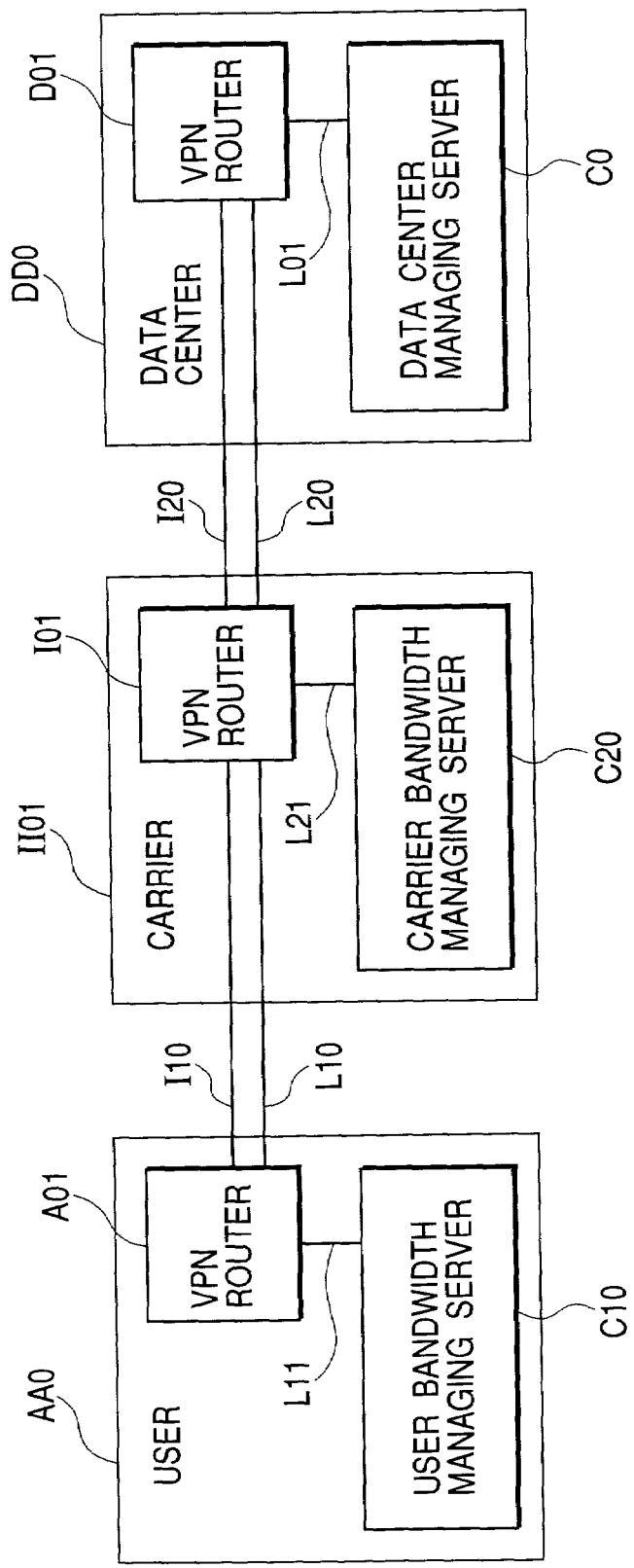
FIG. 3 is an example 1 of a VPN configured from the user to the data center via a carrier.
Figure 4:
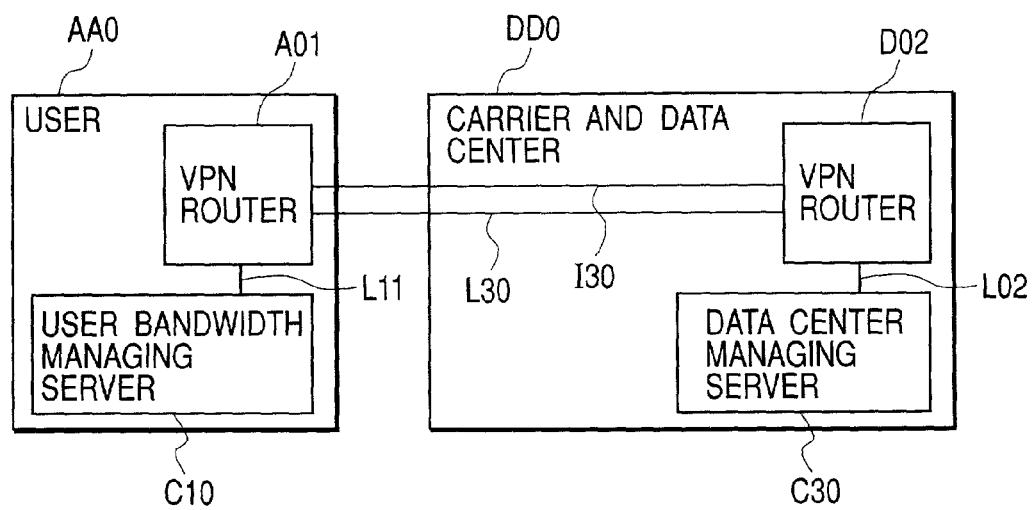
FIG. 4 is an example 2 of a VPN configured from the user to the data center via a carrier.
Figure 5:
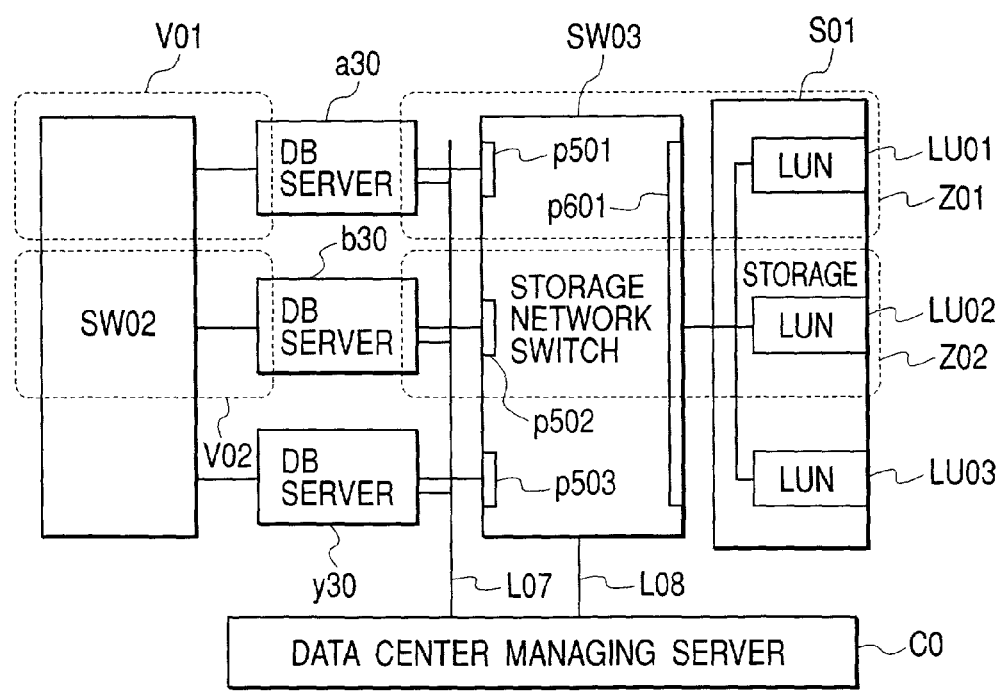
FIG. 5 is an example of a storage network configuration of the data center of FIG. 2.
Figure 9:
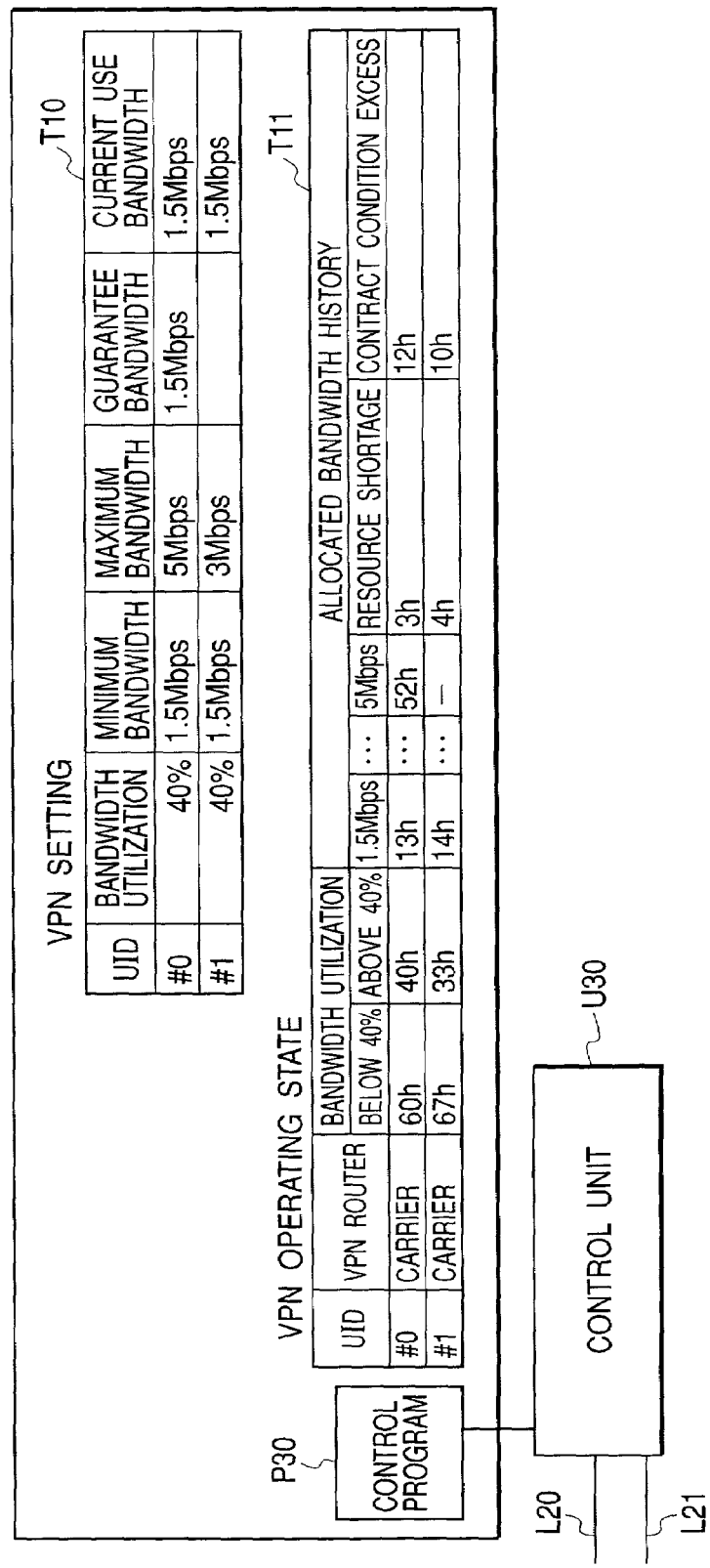
FIG. 9 is a list of VPN-related information held by a carrier bandwidth managing server.

FIG. 1 shows an example in which a data center targeted in the present invention is connected to a user company A (AA0) and a user company B (BB0) via an Internet line company (carrier) (II0). FIG. 2 shows the internal configuration of a data center DD0 of FIG. 1. User-dedicated VLANS V01 and V02 are configured for each of the users A and B. FIGS. 3 and 4 respectively show VPN configurations from the user to the data center in this embodiment. FIG. 5 shows a main configuration of a storage network. User-dedicated zones Z01 and Z02 are configured for each of the users A and B. FIG. 6 is a diagram to collect server allocation and VLAN-related information possessed by a managing server C0 of the data center DD0. FIG. 7 is a diagram to collect VPN-related information possessed by the managing server C0 of the data center DD0. FIGS. 8 and 9 are diagrams to collect VPN-related information possessed by a user bandwidth managing server C10 and a carrier bandwidth managing server C20, respectively. In the following description, the network refers to the Internet. One VPN router of the carrier and so on seems to exist in FIG.

1, but actually, plural VPN routers may exist. In this case, the control procedure is the same.

Figure 10:
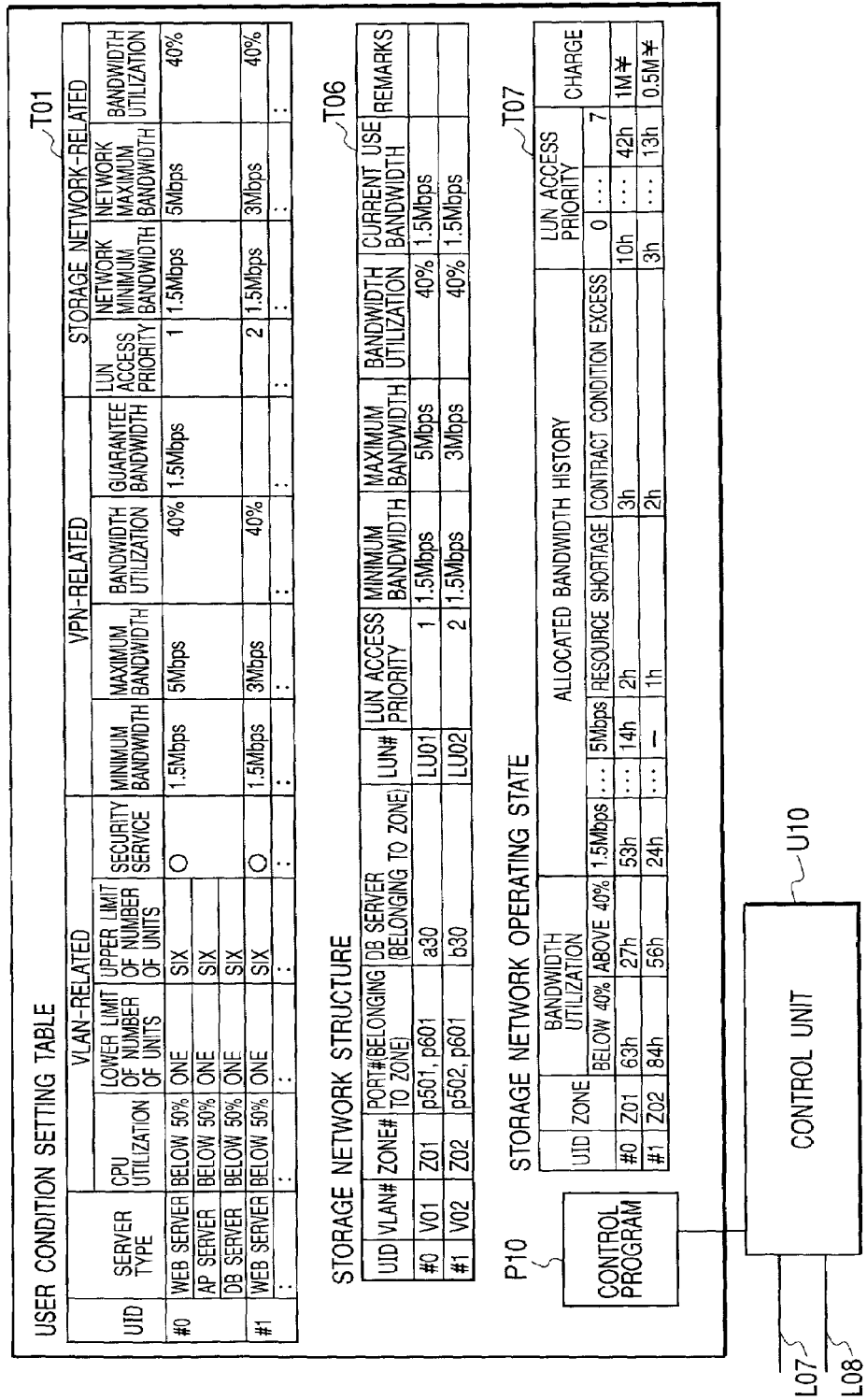
FIG. 10 is a list of storage network-related information held by the data center managing server of FIG. 2.

FIG. 10 is a diagram to collect storage network-related information possessed by the managing server C0 of the data center DD0.

Figure 11:
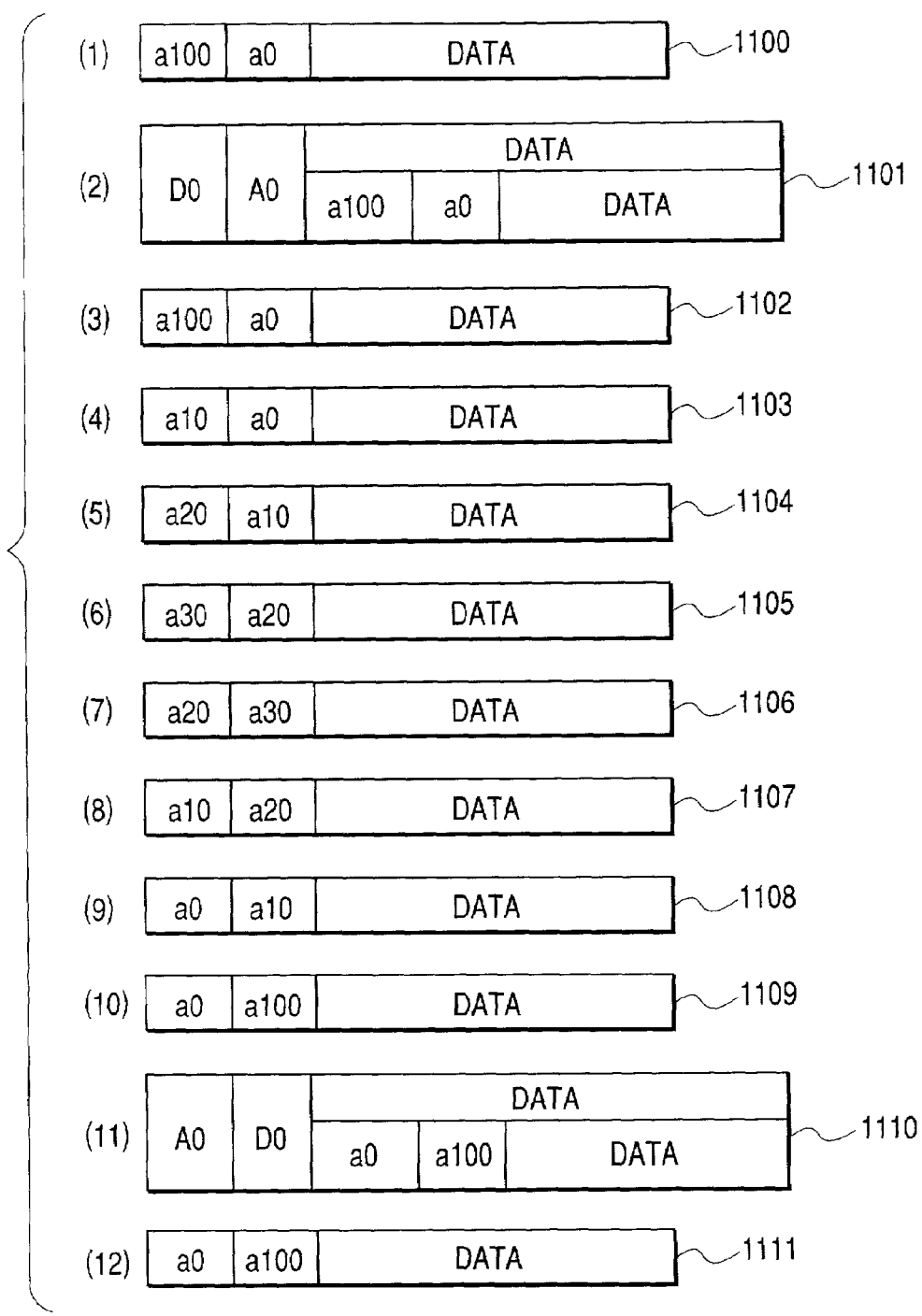
FIG. 11 is a list of packets processed in the data center from the user.

FIG. 11 is a list of packets the user A uses for communication in explaining the first embodiment. FIGS. 12 and 13 respectively show an example of an input screen when the user company A makes a use agreement with this data center. In the agreement of this example, the user company A uses all the web servers, AP servers, DB servers in the data center, and uses a network bandwidth of 1.5 Mbps to 5 Mbps.

Figure 15:
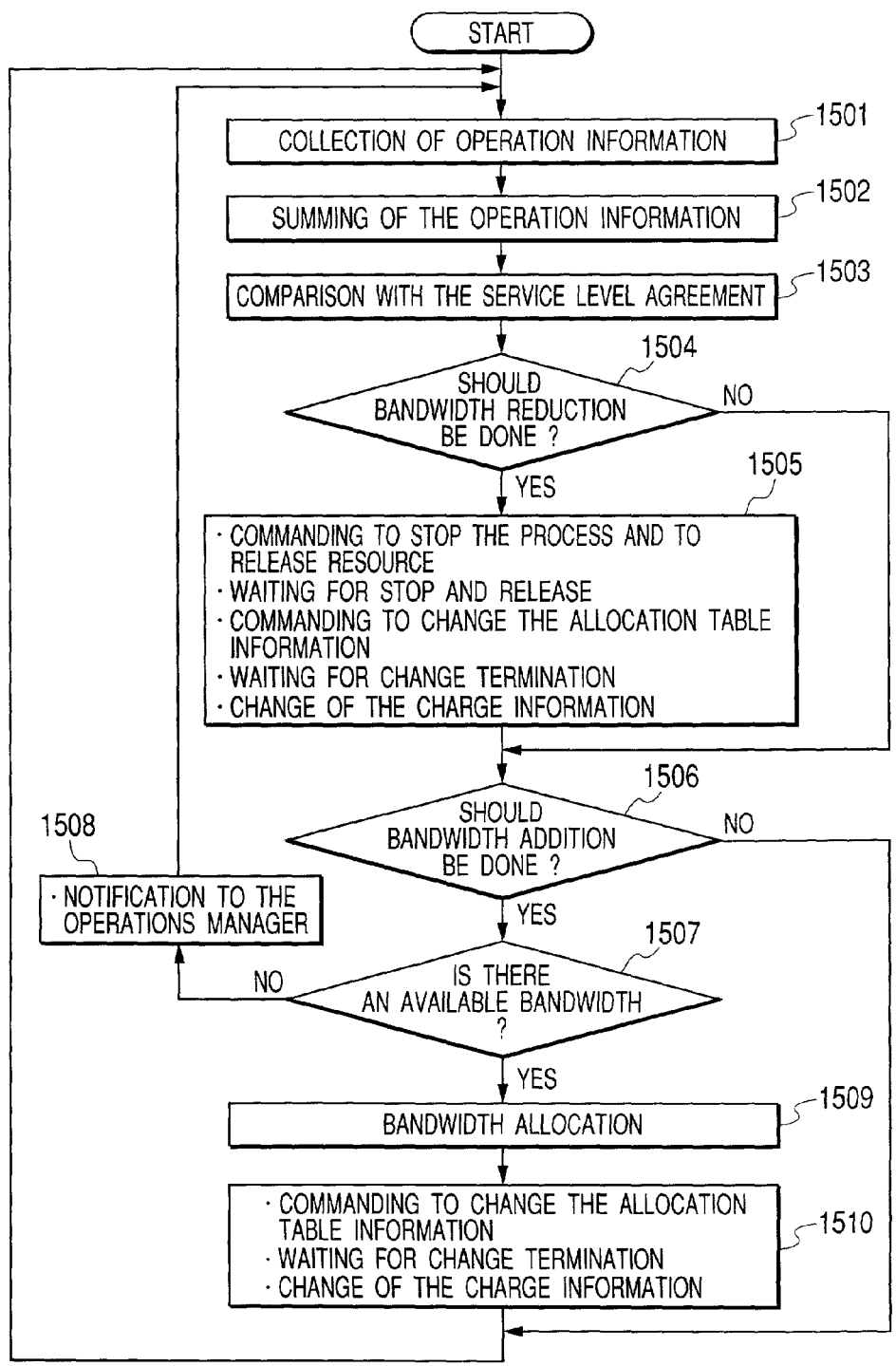
FIG. 15 is a flowchart of change of the network bandwidth allocation to the user.
Figure 16:
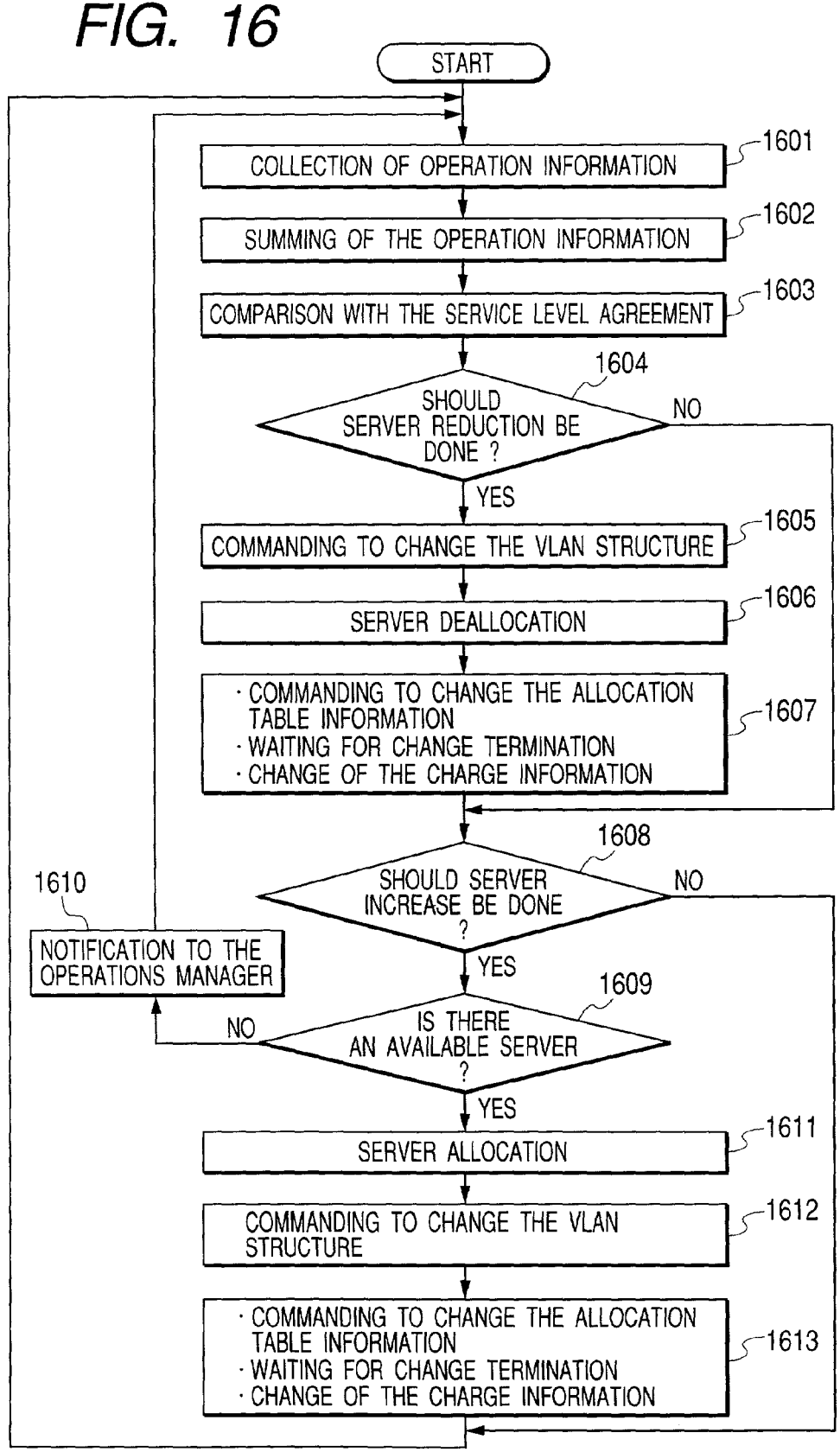
FIG. 16 is a flowchart of change of the server and VLAN allocation to the user.
Figure 26:
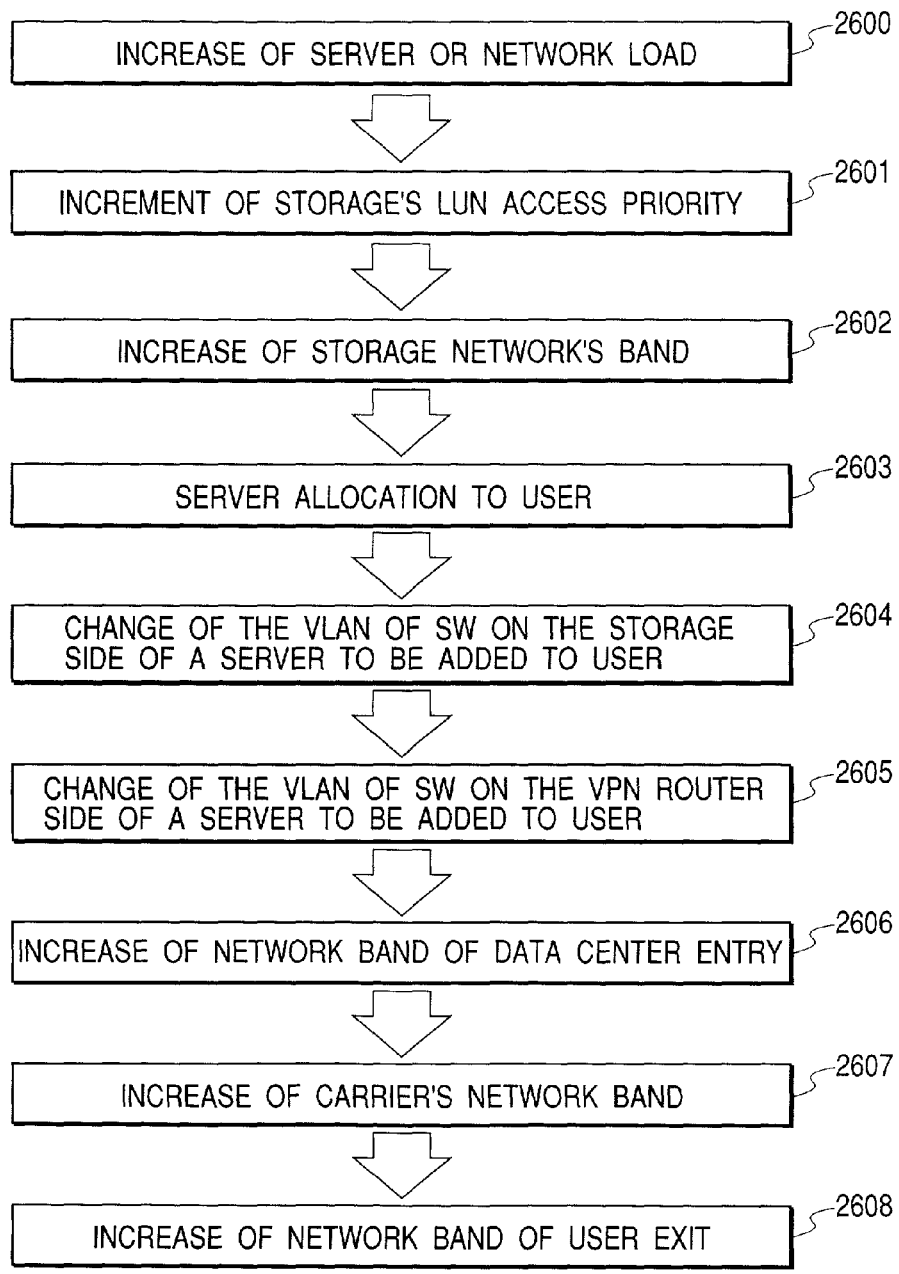
FIG. 26 is a change procedure related to each element of the VPN, VLAN and storage network when a load is increased.
Figure 27:
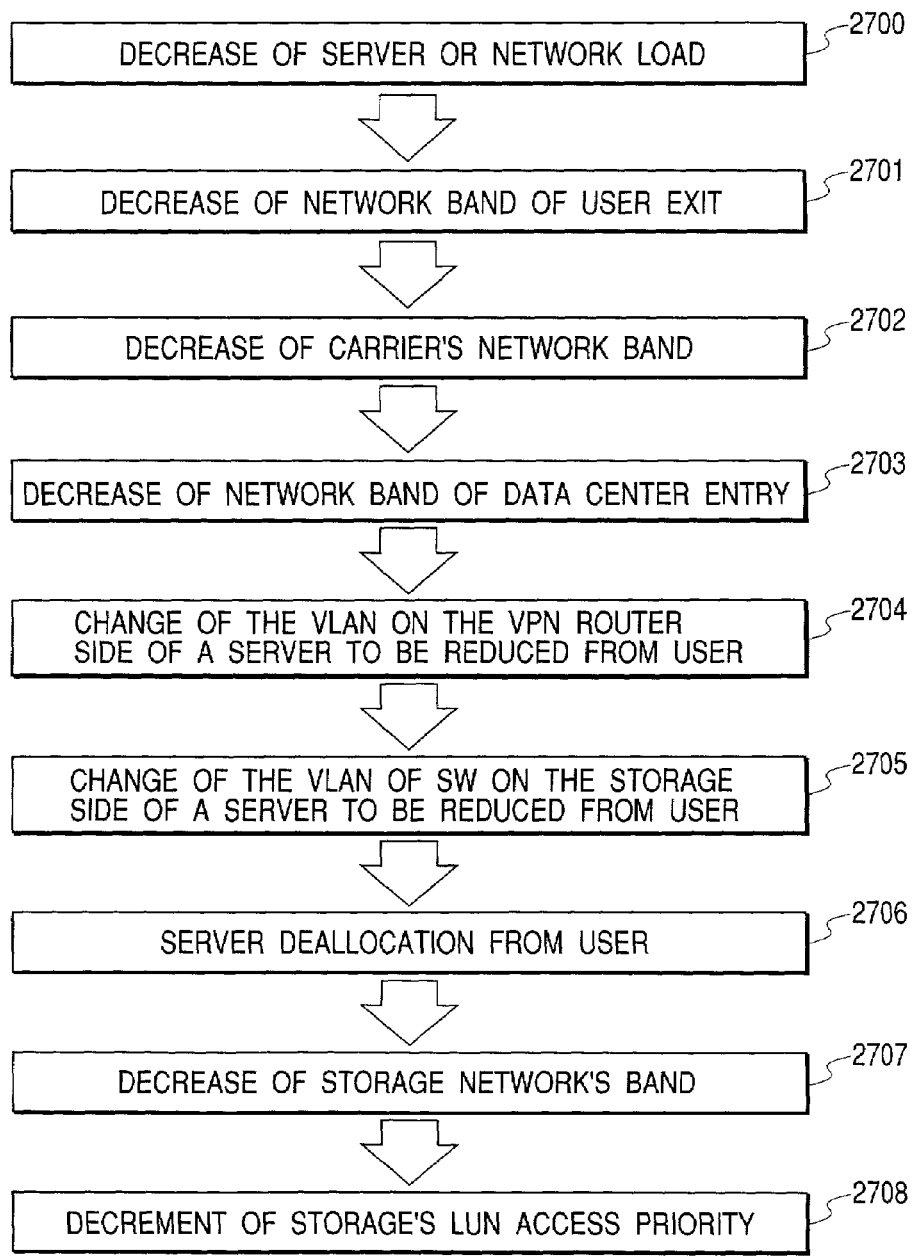
FIG. 27 is a change procedure related to each element of the VPN, VLAN and storage network when a load is decreased.
Figure 28:
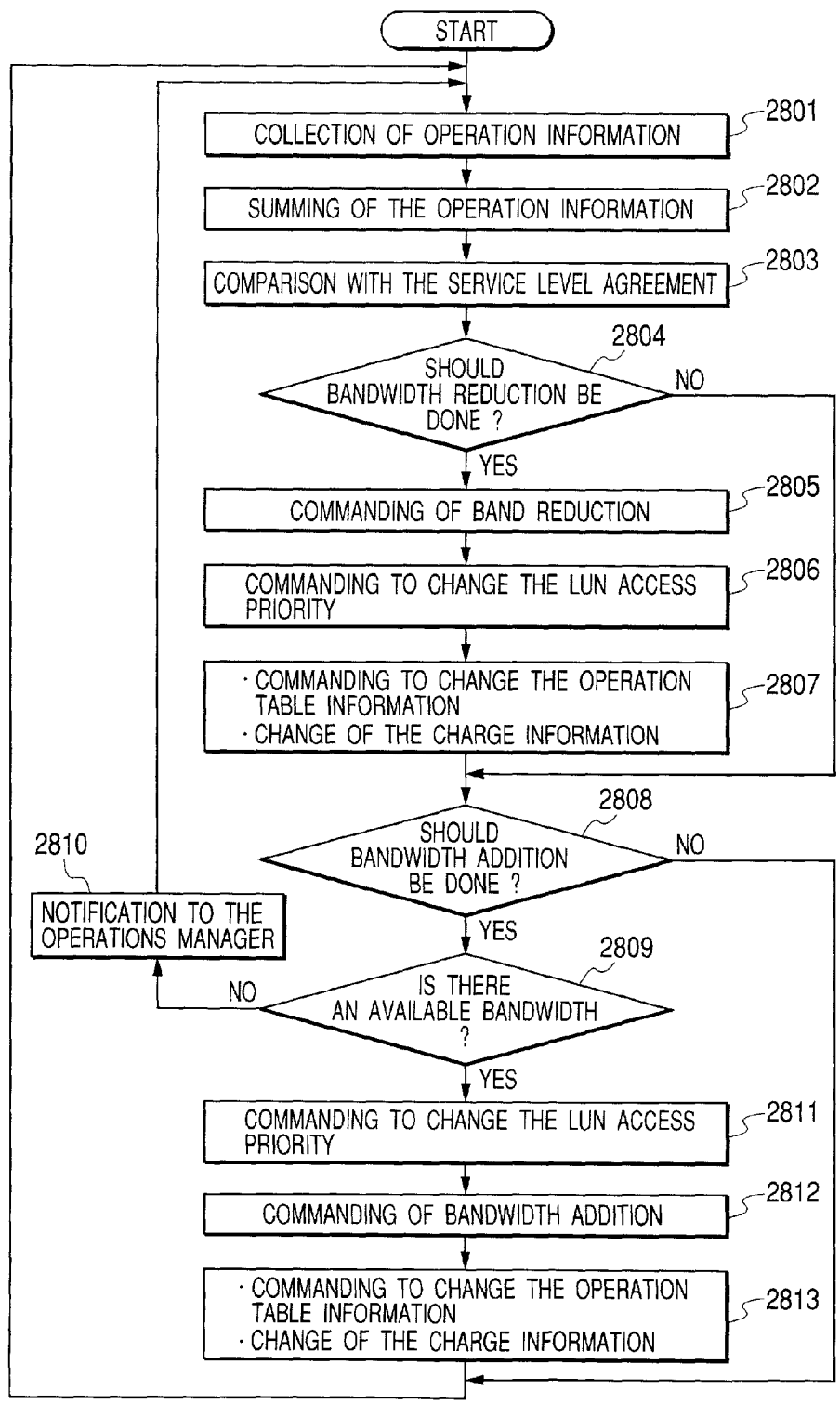
FIG. 28 is a flowchart of change of the storage network allocation to the user.

FIG. 14 shows a procedure to allocate servers and a network bandwidth to the user who makes an agreement when the system is started up. FIG. 15 shows a procedure to dynamically add or reduce the network bandwidth allocated to the user. FIG. 16 shows a procedure to dynamically increase or decrease the number of servers allocated to the user. FIG. 26 shows a control procedure related to each part of the VLAN, VPN and storage network when a load is increased. FIG. 27 shows a control procedure related to each part of the VLAN, VPN and storage network when a load is decreased. FIG. 28 shows a procedure to dynamically add or reduce the storage network bandwidth allocated to the user. The embodiment will now be described. A client a0 of FIG. 1 has a private network address of an A company system and is connected through a VPN (Virtual Private Network) router A0 to a VPN router D0 of the data center via a VPN router I01 of the carrier. FIG. 2 shows the configuration of the data center DD0. This embodiment shows the case of a three-layer configuration of web servers providing a web browser interface to a user request, AP servers operating an application program produced via the web server, and DB servers processing a database access request from the application program.

FIGS. 12 and 13 respectively show one example of an input screen when the user company A makes a service level agreement with this data center. In this example, at least one web server, AP server and DB server are allocated to the user company A and all of them are operated at CPU utilization below 50%. In this agreement, when the utilization is above 50%, the allocating number of the web servers, AP servers and DB servers is increased up to six. In the network bandwidth agreement, whether the user's use bandwidth is guaranteed or not is selected in FIG. 12. A specific use bandwidth agreement is made in FIG. 13. In this example, a checkmark is inputted to the use bandwidth guarantee selection column on the input screen, and 1.5 Mbps at the minimum is allocated to the specific bandwidth for operation so that the bandwidth utilization is below 40%. When the bandwidth utilization is above 40%, an agreement to increase the bandwidth up to 5 Mbps is made.

Based on the above-mentioned agreement on the input screen, the A company is given a web server a10, an AP server a20 and a DB server a30, and the B company is given a web server b10, an AP server b20 and a DB server b30. In this embodiment, one server is allocated to each layer of the user. Allocation of two or more servers may be considered. With a LUN (Logic Unit Number) unit of a storage s01, LU01 is allocated to the A company and LU02 is allocated to the B company. Servers y10, y20 and y30 are preliminary servers to be allocated when a load of the A company and the B company is increased. y10, y20 and y30 are described to be one in number, but existence of two or more preliminary servers may be considered.

A representative IP address used by the A company is a100 for the web server. The B company uses an IP address b100 for the web server. This embodiment describes one Web server, AP server, DB server and client. When they are plural, the embodiment is the same.

Referring to the drawing, how the switches centering on the servers and the load balancer in this data center process a request of the user A using the servers a10, a20 and a30.

The configuration of a request packet sent out to the VPN router A0 by the client a0 in FIG. 1 is as shown in FIG. 11(1) 1100. The head of the packet is an address of a destination server and the next is an address of the sending client. The VPN router A0 capsules the VPN when sending out the packet to the Internet line I10 to generate a packet 1101 of FIG. 11(2). The VPN router D0 uncapsules this packet. A technique for capsuling and uncapsuling the packet is known.

When the packet 1101 of FIG. 11(2) inputted from a signal line I0 is uncapsuled, a packet 1102 of FIG. 11(3) is generated and is outputted to a load balancer LB01 via a signal line I1. The user accesses the representative addresses a100 and b100 configured for the load balancer to refer to information corresponding to a load balancer address table T00 of FIG. 6 possessed by the data center managing server C0 with the load balancer LB01. The load balancer LB01 corresponds the destination address a100 of the packet 1102 of FIG. 11(3) with information corresponding to the address reference table T00 of FIG. 6 set to the load balancer LB01 to generate a packet 1103 of FIG. 11(4) in which the representative address (virtual address) of each user is converted to the address a10 of the real server. A technique itself for destination selection and change is known. Information corresponding to the column of port# (LB01) of a corresponding table T02 is referred to send the packet 1103 only to a port belonging to the user-dedicated VLAN. FIG. 2 shows the case of sharing an entry p000 of the load balancer LB01 by plural users (plural VLANs) with a VLAN tagging technique. The user-dedicated VLAN is configured in the data center for each user. The VLAN tagging technique allows a packet having VLAN information (VLAN tag) to be flowed from the user. The packet having VLAN information can be flowed only through the same VLAN network. For this reason, security of each user can be held. The table T02 of FIG. 6 shows a list of users, VLANs configured for the users, and servers and switch ports belonging to the VLANs. In other words, it shows with which server the server allocated to the user can be communicated. The user locally configures VLANs by plural network switches. Combination of the VLAN configurations can configure the user-dedicated VLAN across plural units. For example, in the case of the user A, by interposing the web server a10, the LB01 locally configures a VLAN to a port p001, the SW01 locally configures a VLAN to p101 and p201, and the two local VLANs are configured for the same group to realize a user-dedicated VLAN across the LB01 and the SW01. When this effect is shown and the user A attempts to access the web server b10, the access is denied because the web server b10 belongs to the VLAN V02 and the user A belongs to the VLAN V01.

The web server a10 receives the packet 1103 of FIG. 11(4) and generates a packet 1104 (FIG. 11(5)) which is an access request to a20 when requiring access to the AP server as the result of web processing. This packet is received by the network switch SW01 via the port p101. The network switch SW01 is configured to information corresponding to the column of port# (SW01) of the VLAN configuration table T02 of FIG. 6, that is, so that the A p101 and p201 belong to the same VLAN. The packet 1104 (FIG. 11(5)) can be sent to the destination address a20.

Likewise, the AP server a20 generates a packet 1105 to be processed in the DB server a30. Similarly, the DB server a30 sends a response to the AP server a20, the web server a10 and the client a0, and packets 1106 to 1110 a regenerated sequentially. This is the same for the VLAN configuration.

When there is a request from the user company B, it passes through the VPN router D0 and the load balancer LB01 by the above procedure and is processed in the servers b10, b20 and b30. (The packet form is the same and is not shown.)

As described above, the servers executing the processes of the users A and B are divided into the VLAN to which the servers a10, a20 and a30 belong and the VLAN to which the servers b10, b20 and b30 belong.

In this explanation, it is considered the case that both the users A and B desire a security service in FIG. 12 to configure a user-dedicated VLAN. When desiring the security service in FIG. 12, a user-dedicated VLAN is configured for each user. When not desiring it, the service is received by the VLAN shared by the users.

In FIG. 2, the managing server C0 monitors the operating state of the servers, load balancer, VPN router, and network switch via the signal lines L01 to L08. The monitoring contents depend on the contents of the service level agreement with the user, for example, CPU utilization. The monitoring program may be operated on the managing server C0, and may be operated on the servers and the load balancer. The managing server C0 obtains the contents of the operation table (VPN operating state table) of T05 of FIG. 7 related to the network bandwidth use for each user from the VPN router D0 via the signal line L01.

FIG. 6 is a diagram showing information of the server configuration and the VLAN configuration possessed by the managing server C0. VPN-related information of the network bandwidth and storage network-related information will be described later. T01 of FIG. 6 is a user condition setting table in which a control program P10 configures it based on the service level agreement input screens of FIGS. 12 and 13.

Thereafter, based on information of T01 of FIG. 6, the server and VLAN configuration table of T02 is created. In this agreement, the A company user is given at least one web server, AP server and DB server, all the given servers operate the program at CPU utilization below 50%, and if the utilization is above it, the number of servers is increased up to six. Likewise, in the agreement, the B company user is given at least one web server, AP server and DB server, all the given servers operate the program at CPU utilization below 50%, and if the utilization is above it, the number of servers is increased up to six. T02 also holds information of the security option service column inputted in FIG. 12, and when inputting a checkmark to the column, a user-dedicated VLAN is configured.

The control program P10 checks the monitoring result against the user condition setting table T01 of FIG. 6, and checks if the current resource allocation satisfies the service level agreement to store the result into a server and LAN operation table T03 of FIG. 6. Into the server and VLAN storage table T03 of FIG. 6, are recorded a list of servers currently allocated to the user A, the column of allocation time history in each allocating number, and the column of a history of total time operated at above the CPU utilization set in the service level with respect to all the servers given to the user A and total time operated at below it. The column above the CPU utilization is recorded in the case that a load which cannot be processed in the maximum number of servers the user makes an agreement is included and in the case that there's a shortage of preliminary servers which cannot be allocated when attempting to perform server allocation. Unless the monitoring result satisfies the service level agreement, the control program P10 increases the number of allocated servers. To manage server allocation, there are held the column of server of the VLAN configuration table T02 of FIG. 6 showing the identification of the user and the given server and the load balancer address correspondence table T00 which is a correspondence table of virtual server name recognized by the user and the given real server. The server and VLAN operation table T03 of FIG. 6 records a history of the number of allocated servers and charge-related information such as resource shortage time. Charging will be described later.

To perform the above control, a procedure in which the control program P10 divides resources when the system is started up will be described with FIG. 14.

First, information shown on the service level agreement input screens of FIGS. 12 and 13 is inputted (1401). The data center managing server C0 creates the user condition setting table T01 (1402).

Information shown on the service level agreement input screen of FIG. 13 is inputted to create a virtual addr column in the server address correspondence table T00 by a virtual address inputted by the user (1403). Server allocation is performed to the web servers, AP servers and DB servers, respectively, to configure a user-dedicated VLAN. A network bandwidth and a storage (LUN) allocated to the user are configured. Specifically, referring to the user condition setting table T01, that each user should be given at least one server is detected to allocate a server, and the allocated server is described into the column of the allocated server of the VLAN configuration table T02 (1404). The storage-side port and the router-side port connected to the server are described into the column of port# of the VLAN configuration table T02 to provide a VLAN configuration command to network switches SW01 to SW02. For example, in the case of the user A, a VLAN configuration command is provided to the network switch SW01 so that the ports p101 and p201 belong to the same VLAN. Thereafter, a real addr column of the server address correspondence table T00 is created (1405). Based on the user condition setting table T01, a VPN configuration table T04 and a storage network configuration table T06 are created. The network and storage network bandwidths are allocated and are then described into the column of the bandwidth of the VPN configuration table T04 and the column of the bandwidth of the storage network configuration table T06. The data center managing server provides a bandwidth configuration command to the user managing server and the carrier managing server to configure a bandwidth to each VPN router (1406). Specifically, information of the columns of the minimum and maximum bandwidths, the threshold value of the bandwidth utilization, and the guarantee bandwidth in the VPN of T01 is sent to the user bandwidth managing server via the signal line L0. The user bandwidth managing server creates a VPN configuration table T08 using information in the columns of the minimum and maximum bandwidths, the bandwidth utilization and the guarantee bandwidth in the user condition setting table T01 which is then configured for the VPN routers A0 and B0. Likewise, the carrier bandwidth managing server creates a VPN configuration table T10 to be configured for the VPN router I01.

Finally, the copy of the created server address correspondence table T00 is configured for the load balancer LB01 via the signal line L02 (1407).

Based on the user condition setting table T01, the server and VLAN operation table T03 of FIG. 6, the VPN operation table T05 of FIG. 7, and the storage network operation table T07 of FIG. 8 are created (1408). Specifically, columns to record a CPU utilization history and a network bandwidth utilization history to the user A are created.

Information necessary for resource division control is thus generated to be configured for the VPN router D0 and the network switches SW01 to SW03. The system operation can be started in a state where the resources are divided correctly.

A procedure in which the control program P10 changes server allocation when a load is fluctuated will be described below with FIG. 16. It will be described taking the Web server as an example.

As described above, the operation information of each server is monitored to all the users via the signal lines L01 to L08 (1601). The operation information is summed for each user to be stored into the server and VLAN operation table T03 of FIG. 6 (1602). After comparison with the user condition setting table T01 of FIG. 6 (1603), the result is checked against the service level agreement to study whether server deallocation can be done (1604). As one example of a method for judging whether server deallocation can be done, a method for performing proportioning calculation to the product of CPU utilization and the number of servers. For example, the service level agreement of the user A has CPU utilization below 50%. Four web servers are currently given. When all the web servers have CPU utilization below 25%, it can be judged that the number of the web servers can be decreased down to two. When plural users exist, a server deallocation process is performed to all the users, and then, a server allocating process is performed to all the users. The web server a10 is deallocated here. When it can be deallocated, the server a10 is removed from the column of the real addr of the address correspondence table T00. The load balancer LB01 is commanded to configure the contents of the column of the real addr. In the VLAN configuration table T02 of the managing server, the ports p001 and p101 connected to the server a10 removed from the columns of port# (LB01) and port# (SW01) are removed.

Thereafter, the port p001 of the LB01 connected to the web server a10 is removed from the VLAN to perform a process for removing the port p101 of SW01 from the VLAN. After a VLAN change process of the router-side switch is terminated, a VLAN change process of the storage-side switch is performed (1605).

The server a10 to which the deallocating process is notified terminates the process of the program to release the resource being used. In other words, the contents are switched and disk cache is erased (1606).

The deallocated server notifies to the managing server C0 that the release is terminated. The managing server C0 waits for it to change the column of the web server of the VLAN configuration table T02 of FIG. 6. In the server and VLAN operation table T03, the parameter of charge information such as a history of the number of servers (1607). In this example, the column of the history of the number of servers of the server allocation history table of T03 discriminates between the allocation histories of the web servers, AP servers and DB servers for recording. The unit price can be changed for the respective servers so that a charge can be calculated by the product of the allocating number for the respective servers, the allocation time history and each unit price. The web server is taken as an example. In the case of other servers, there is no real address change command to the load distributor. Instead of that, server deallocation is notified to the application by some method to make a change of only VLAN to the port of the network switch.

Back to the description of FIG. 16, whether the number of the servers must be increased or not is studied (1608). Judgment how many servers should be increased uses proportioning calculation like deallocation. When the number of the servers must be increased, whether there is an available server allocated to web servers, AP servers and DB servers, respectively, is checked with reference to the VLAN configuration table T02 (1609). When there is no available server, it is notified to the operations manager. An unsatisfied service level which disables server allocation due to resource shortage and an unsatisfied service level due to user's agreement excess are discriminated for recording (1610). When there is an available server, the required number of the servers is selected from the available server y10 to be allocated to the user which is then allocated to the user (1611). Thereafter, the server allocated to the column of the web server of the VLAN configuration table T02 of FIG. 6 is added. The columns of port# (SW01) and port# (LB01) are changed to the VLAN configuration table T02 of the managing server so as to configure the contents of the column of port# (LB01) for the load balancer LB01 and the contents of the column of port# (SW01) for the network switch SW01.

Thereafter, the VLAN of the user is changed in the order of the storage-side port and the router-side port connected to the web server so as to allocate to the VLAN a switch port p103 connected to the server y10 to be allocated on the SW01 side and a switch port p03 on the LB01 side in that order (1612). Finally, the data center managing server C0 changes y10 allocation to the column of the real addr in the load balancer address correspondence table T00 to command to the load balancer to configure it. Change of the contents of the load balancer LB01 and the network switch SW01 is confirmed. The parameter related to charge information such as the number of allocated servers is changed (1613).

The web server is taken as an example. Change of the load balancer address correspondence table must be considered in the process of change. In the case of AP and DB servers, the load balancer configuration is not changed. Instead of that, server deallocation is notified to the application by some method to change only the VLAN related to the port of the network switch.

The procedure of the control program P10 on the managing server C0 is described above.

As an advantage of this change method is that the utilization of the server resource in the data center is high since the server allocation and deallocation is commanded from the user before providing a server allocation increase command to all the users, When the order is not followed and server allocation to the user is performed previously, it is considered that there may be a shortage of the preliminary server temporality. The server in which the server utilization of the user is low may be deallocated in the later server deallocation process. It is hard to say that the server resources are used efficiently. Network bandwidth allocation and storage network bandwidth allocation are considered likewise.

A procedure in which the control program P10 changes network band allocation of the Internet when a load is fluctuated will be described with FIG. 15. There are three cases by the VPN realizing method between the user and the data center. A method for changing a VPN bandwidth is known. Information possessed by the data center managing server will be described here.

In FIG. 7, VPN-related information in the user condition setting table T01 includes the columns of the minimum and maximum bandwidths and the threshold value of the band utilization. The VLAN configuration table T04 is a table for holding the condition in which the user configures the minimum bandwidth, the maximum bandwidth and the band utilization to be created with reference to the user setting condition table T01. This is used to judge whether the service level agreement of the network bandwidth is satisfied. In the VPN operating state table T05, for the bandwidth allocated to the user in each VPN router of the user, carrier and data center, there exist the columns of a history of time to satisfy the band utilization and time not to satisfy it and a history of the bandwidth allocated to the user from the minimum bandwidth to the maximum bandwidth.

FIG. 8 is a diagram summarizing information of VPN routers held by the user bandwidth managing server. A VPN configuration table T08 is a table for holding the user setting condition of the minimum bandwidth, maximum bandwidth and the bandwidth utilization. In the VPN operating state table T09, for the bandwidth allocated to the user in VPN router of the user, there exist the columns of a history of time to satisfy the bandwidth utilization and time not to satisfy it and a history of the normalized bandwidth allocated to the user from the minimum bandwidth to the maximum bandwidth. FIG. 9 is a diagram summarizing information of VPN routers held by the carrier bandwidth managing server. A VPN configuration table T10 is a table for holding the user setting condition of the minimum bandwidth, the maximum bandwidth and the bandwidth utilization. In a VPN operating state table T11, for the bandwidth allocated to the user in VPN router of the carrier, there exist the columns of a history of time to satisfy the band utilization and time not to satisfy it and a history of the bandwidth allocated to the user from the minimum bandwidth to the maximum bandwidth. The T04 has the column of a guarantee bandwidth which is filled in when the band guarantee service is done in FIG. 12. When it is judged that the network load of plural users is increased at the same point and the network bandwidth of the plural users must be increased, to the user who desires the band guarantee service in FIG. 12, the network bandwidth allocation is changed in preference to a user who does not desire the bandwidth guarantee service.

The respective cases considered as VPN configuration will be described below.

(1) A first case will be described. It is considered the case that the VPN realizing method has three VPN routers of the data center, the carrier and the user, as shown in FIG. 3, and the data center managing server commands all the bandwidth changes. The description is provided in comparison with the flowchart of the change of the network bandwidth allocation to the user, to as shown in FIG. 15. The data center managing server monitors network bandwidth information in each VPN router via the signal lines L01, L10 and L20 through the managing servers of the user and the carrier (1501), and sums operation information for each user which is then stored into the VPN operation table T05 of FIG. 7. The data center managing server C0 compares the bandwidth utilization with the service level agreement (1503) to study whether network bandwidth reduction can be done (1504). In consideration of the case that the configured bandwidth is 3 Mbps, the real use bandwidth is 0.5 Mbps and the threshold value of the band utilization is 40%, bandwidth reduction can be judged. In the case of the VPN, after the bandwidth reduction process of all the users is performed like server allocation, a bandwidth addition process is performed. When the bandwidth is to be reduced, the data center managing server notifies a band reduction command to the managing servers of the data center, user and carrier via the signal lines L01, L10 and L20. The managing server who has received the notification commands the VPN router under management to release the bandwidth being used. The order to release the bandwidth is performed in the order of the user, carrier and data center. When release of the bandwidth is terminated, the managing server notifies it to the data center managing server. The managing server C0 waits for it to change the VLAN operation table T05, change the parameter information related to charge such as a history of the used network bandwidth is and change the VLAN operation tables T09 and T11 of the managing server of the user and the carrier (1505).

A process for increasing a network bandwidth will be described next.

The data center managing server C0 compares the bandwidth use information with the service level agreement to study whether network bandwidth addition must be done (1506). The data center managing server C0 refers to the VPN configuration table T04 of FIG. 7 to check whether there is a bandwidth allocatable to the user (1507). When there is no available network bandwidth, it is notified to the operations manager. An unsatisfied service level due to bandwidth shortage and an unsatisfied service level due to agreement excess are discriminated for recording (1508). For example, when the current user allocated bandwidth is 1.5 Mbps, the actual operating bandwidth is 1.2 Mbps, the user-configured band width utilization is 40%, the available bandwid this 1.5 Mbps and there is an available network, network allocation bandwidth addition to the user is command (1509). The network bandwidth is changed in the order of the data center, carrier and user. The contents of the VPN operation table T05 of FIG. 7 are changed. The parameter information related to charge such as a use history of the use bandwidth is changed. The parameter information related to charge such as a bandwidth use history of the VPN operation table T09 of FIG. 8 and the VPN operation table T11 of FIG. 9 is changed (1510).

An advantage of this change method is that VPN network bandwidths through the data center, carrier and user can be controlled together to control the network bandwidth totally judging balance of the load of the entire VPN network and the network load of the server.

(2) In the configuration of FIG. 3, there is one more kind of VPN configuration method which is different from the case of (1). In this method, the data center managing server C0 previously configures a network bandwidth allocation judgment rule to the user bandwidth managing server C10 and the carrier bandwidth managing server C20 via the signal lines L01, L10, L11, L20 and L21. This case will be described in comparison with the flowchart of the change of the network bandwidth allocation to the user, as shown in FIG. 15. The data center managing server C0 collects use states of the network bandwidth in the user, carrier and data center via the signal lines through the managing servers C10, C20 and C0. This information is used for charging. The managing servers of the user and carrier have the VPN configuration table related to the network bandwidth configured from the data center managing server (the table T04 of FIG. 7, the table T08 of FIG. 8, and the table T10 of FIG. 9) and the VPN operation table (the table T05 of FIG. 7, the table T09 of FIG. 8, and the table T11 of FIG. 9). Each of the managing servers monitors network bandwidth use information (1501). The user managing server sums operation information to be stored into the VPN operation table T09 of FIG. 8 (1502). Each of the managing servers compares the network bandwidth use information with the VPN configuration table (T04 of FIG. 7, T08 of FIG. 8, and T10 of FIG. 9) (1503), and checks the result against to the service level agreement to study whether network bandwidth reduction can be done (1504). As in the case of (1), when bandwidth reduction can be done, the managing server performs network bandwidth reduction. The bandwidth reduction is commanded to the router in the order of the user, carrier and data center while contacting between the managing servers. Thereafter, the managing server which manages the VPN router which has performed the reduction process notifies, to the data center managing server, bandwidth information newly allocated to the user via the signal lines L01, L10 and L20. The data center managing server receives information from the managing servers which has made the change, and then, changes the bandwidth history of the VPN operation table T05 of FIG. 7 to change the parameter information related to charge such as a history of the bandwidth used by the user (1505). At the same time, the user VPN operation table T09 of FIG. 8 and the carrier VPN operation table T11 of FIG. 9 are changed. Then, a network bandwidth addition process is performed. The VPN routers of the data center, user and carrier compare the network operating state with the VPN configuration table (the table T04 of FIG. 7, the table T08 of FIG. 8, and the table T10 of FIG. 9) to study whether network bandwidth addition must be done (1506). As in the case of (1), when network bandwidth increase must be done and there is an available network bandwidth managed by the managing servers, the managing servers perform network bandwidth addition to the VPN router under management (1507). When there is no available network bandwidth, it is notified to the operations manager. An unsatisfied service level due to bandwidth shortage and an unsatisfied service level due to agreement excess are discriminated for recording (1508). Thereafter, bandwidth information newly allocated to the user is notified to the data center managing server C0 via the signal line (1509). The network bandwidth is changed in the order of the data center, carrier and user while contacting between the managing servers. The data center managing server receives information from the VPN router which has made the change to change the contents of the VPN operation table T05 of FIG. 7. At the same time, the VPN operation table T09 on the user bandwidth managing server and the VPN operation table T11 of the carrier bandwidth managing server are changed. Finally, the parameter information related to charge such as a history of the bandwidth used by the user is changed (1510).

An advantage of this change method is that control can be performed quickly since the networks of the user, carrier and data center control monitoring and allocation judgment of the bandwidth use.

(3) As in FIG. 4, the data center operator and the carrier operator are the same. In this case, it may be considered that the data center managing server C30 controls the VPN routers of the data center and the user. As in the first case, the description is provided in comparison with the flowchart of the change of the network bandwidth allocation to the user, as shown in FIG. 15. The data center managing server monitors network bandwidth information in each VPN router via the signal lines L11 and L30 (the user bandwidth information is monitored via the user managing server) (1501). Operation information of the bandwidth utilization is summed for each user which is then stored into the VPN operation table T05 of FIG. 7. In this case, the column of the carrier does not exist (1502). The data center managing server C30 compares the bandwidth utilization information with the service level agreement (1503) to study whether network bandwidth reduction can be done (1504). When the network bandwidth can be reduced, the data center managing server C30 notifies a bandwidth reduction command to the user managing server via the signal line. The bandwidth is reduced in the order of the user and the data center. The user managing server which has notified it commands to release the bandwidth being used to the VPN router under management. When release of the bandwidth is terminated, the user managing server notifies it to the data center managing server C30. The data center managing server C30 waits for it, and then, changes the VPN operation table T05 of FIG. 7 to change the parameter information related to charge such as a history of the bandwidth used by the user (1505). The routine is moved to a network bandwidth increasing process. The data center managing server C30 compares the bandwidth utilization information with the VPN configuration table T04 to study whether network bandwidth addition must be done (1506). When it must be increased, the data center managing server refers to the VPN configuration table T04 of FIG. 7 to check whether there is a bandwidth allocatable to the user (1507). When there is no available network bandwidth, it is notified to the operations manager. An unsatisfied service level due to bandwidth shortage and an unsatisfied service level due to agreement excess are discriminated for recording (1508). When there is an available network bandwidth, a network allocation bandwidth addition command is provided to the user managing server (1509). The network bandwidth is changed in the order of the data center and user. Thereafter, the contents of the VPN operation table T05 are changed to change the parameter information related to charge (1510).

As described above, when reducing the bandwidth, the user side reduces it first and when increasing it, the data center side increases it first.

The storage network dynamic change will be described. An overview of the storage network is shown in FIG. 5. As described in the VLAN configuration, the user-dedicated VLAN is configured from the load balancer to the DB server. The DB server, the storage network switch and storage LUN allocated to the user are controlled to belong to the same zone. The data center managing server records configuration information like the storage network configuration table T06 of FIG. 10.

FIG. 10 will be described. FIG. 10 has the user condition setting table T01 created based on the service level agreement input of FIG. 13 which holds the columns of the minimum bandwidth and the maximum bandwidth of the port of the storage network and the threshold value of the bandwidth utilization of the port of the storage network switch, and an agreement set by the user having an initial LUN access priority on the service level input screen. In the storage network configuration table T06, there are, along the contents of the user condition setting table T01, the columns of the maximum and minimum bandwidths of the storage network, the threshold value of the bandwidth utilization agreed in the Service Level Agreement (SLA), allocated LUN, LUN access initial priority, belonging DB server, and port belonging to the zone, and the storage network configuration is described thereinto. In the table T07, for the bandwidth allocated to the user of the user storage network, there exist the columns of a history of time to satisfy the bandwidth utilization and time not satisfy it due to service level agreement excess, a history of the bandwidth allocated to the user from the minimum bandwidth to the maximum bandwidth, and a history of LUN access priority.

A zone technique is known. It is considered that a VLAN and a zone are combined, as shown in FIG. 5, so that the user A attempts to access to LUN of the storage to be used by the user B. At this time, the storage s01 refers to information corresponding to the storage network configuration table T06 of FIG. 10. LUN LU02 of the user B belongs to a zone Z02 and the user A belongs to a zone Z01. The access is denied. The user security is thus held.

A process of a storage network part when a load of the storage network is fluctuated is considered. The data center managing server C0 collects operating states related to the zones to be stored into the storage network operation table T07. Specifically, the description is provided in comparison with the flowchart of the storage network allocation to the user, as shown in FIG. 28. The data center managing server monitors bandwidth information of the storage network via the signal line L08 (2801) and sums operation information for each user to be stored into the storage network operation table T07 of FIG. 10 (2802). The use bandwidth of the storage network switch SW03 is compared with the storage network configuration table T06 of FIG. 10 (2803). After checking against the service level agreement, whether network bandwidth reduction can be done is studied (2804). In the storage network, an increasing process is done after terminating the reducing process to all the users. When the network bandwidth can be reduced, the managing server C0 changes the column of the access priority and the column of the use bandwidth of the storage network configuration table T06 of FIG. 10. A reduction request of the network bandwidth to be reduced is provided to the storage network switch SW03 via the signal line. The storage network switch SW03 which has received the notification reduces the storage network bandwidth used by the user (2805). The storage network switch SW03 is notified by the signal line to decrement the access priority to the LUN of the storage. For example, when reducing the bandwidth, an instruction to decrement the access priority to the LUN only by a predetermined amount is issued (2806). The storage network switch SW03 which has received the notification decrements the access priority of the storage. Thereafter, the column of the access priority of the storage network operation table T07 of FIG. 10 and the column of the use bandwidth of the table T06 of FIG. 10 are changed. The parameter information related to charge such as a history of the bandwidth used by the user and a history of the access priority is changed (2807).

The routine is moved to a storage resource increasing process. The data center managing server performs comparison with the storage network configuration table T06 of FIG. 10 to study whether the network bandwidth of the storage network must be added (2808). When it must be increased, the data center managing server refers to the user condition setting table T01 to check if there is a bandwidth which can be allocated to the user (2809). When there is no available network bandwidth, it is notified to the operations manager. An unsatisfied service level due to bandwidth shortage and an unsatisfied service level due to agreement excess are discriminated for recording (2810). When there is an available storage network bandwidth, the data center managing server C0 changes the column of the access priority and the column of the use bandwidth of the storage network configuration table T06 of FIG. 10 and notifies to the storage network switch SW03 via the signal line to increment the access priority to the LUN of the storage. For example, when increasing the bandwidth, a command to increment the access priority to the LUN by a predetermined amount is provided. The storage network switch SW03 which has received the notification increments the access priority of the storage (2811). A storage network allocation bandwidth addition command to the user is provided to the storage network switch SW03 (2812). Thereafter, the data center managing server changes the column of the access priority of the storage network operation table T07 of FIG. 10 and the column of the use bandwidth of the table T06 of FIG. 10. The parameter information related to charge such as a history of the storage network bandwidth used by the user and a history of the access priority is changed (2813).

When the procedure to change the storage network bandwidth and the access priority is reversed, in the case that requests are flooded into the storage in the storage network, access busy to the storage is caused, resulting in lowered performance. This change order is thus essential.

FIGS. 26 and 27 summarize the resource allocation change procedure of the entire system having the user, carrier and data center described in this embodiment of this invention when the user load is increased and decreased.

The configuration of FIG. 26 showing the change procedure when the system load is increased is divided into the VPN change part from 2606 to 2608, the VLAN change part from 2603 to 2605, and the storage network change part from 2601 to 2602. For the process change order, in the groups of the VPN part from 2606 to 2608, the VLAN part from 2603 to 2605, and the storage network part from 2601 to 2602, change is made in order which is essential in the meaning that lowered security and deteriorated web service are not caused by the change and in the meaning that the web service is not deteriorated in the course of the change in the order of the storage network, VLAN and VPN group. A specific example is shown. When the change order of the VPN change part is not followed, it is considered the case that when the network load is large, the bandwidth addition of the data center entry is changed after changing the bandwidth addition of the user's network exit. Access to the data center is concentrated to deteriorate the web service quality caused by the network busy of the data center. Further, the case of not following the change order of the VLAN part is considered. For example, when the web server y10 is considered to be allocated to the user A network in FIG. 2, the VLAN is changed in the order of LB01 and SW01 to access the idle server in the data center. There is a possibility that the system security may not be held.

The configuration of FIG. 27 shows the change procedure when the system load is decreased. In the groups of the VPN change part from 2701 to 2703, the VLAN change part from 2704 to 2706, and the storage network change part from 2707 to 2708, change is made in order. The change procedure is essential in the meaning that lowered security and deteriorated web service are not caused by the change and in the meaning that the web service is not deteriorated in the course of the change in the order of the VPN, VLAN and storage network groups.

The case of not following the change order of the VLAN part is considered. For example, when the web server a10 is considered to be deallocated from the user A network in FIG. 2, the VLAN is changed in the order of SW01 and LB01 to access other idle servers in the data center. There is a possibility that the system security may not be held.

Change policies related to this change will be described below.

(i) When the system load is large, change is made from the deep layer to the surface layer; and (ii) When the system load is small, change is made from the surface layer to the deep layer.

Finally, charging of this system will be described. It is divided into three parts of the VPN, VLAN and storage network to charge to the user for the total of charges in each part. (The data center includes a charge of the carrier).

(i) About the VPN Part

A charge is determined by (fee of allocated bandwidth in unit time×allocation time to user−basic penalty of unsatisfied bandwidth agreement×time of unsatisfied bandwidth agreement due to network resource shortage)×(weighting coefficient). In other words, the penalty is subtracted from the use fee of total use time.

The basic fee of the bandwidth is changed stepwise depending on the magnitude of the bandwidth allocated to the user.

The allocated bandwidth fee defines b as a bandwidth and b is expressed to be normalized. At this time, P(b): Use fee per unit time in the case of the network bandwidth b allocated to the user; and T(b): Time in which the network bandwidth b is allocated to the user.

Then, a charge of the total use time of the user is allocated by:

$$\Sigma_b P(b) \times T(b) \tag{Equation 1}$$

Various fee settings for P(b) are considered like step function and proportioning function by b value. The (weighting coefficient) is typically 1, and is a coefficient having a value larger than 1 when selecting the band guarantee service in FIG. 12.

(ii) About the VLAN Part

A charge is determined by (basic fee of one server×the allocating number to user×allocation time to user−basic penalty of unsatisfied service level agreement×the allocating number to user×time of unsatisfied service level agreement due to server shortage)×(weighting coefficient).

The basic concept of charging of the total use time of the user is similar to equation 1 of (i). The (weighting coefficient) is typically 1, and is a coefficient having a value larger than 1 when selecting the security option service in FIG. 12. The server use fee is a total calculated for the web, AP and DB layer. Similar to the VPN part of the (i), the basic fee of the server is changed stepwise depending on the number of servers allocated to the user.

(iii) About the Storage Network Part

A charge is determined by (basic fee of allocated bandwidth in unit time)×(allocation time to user+basic fee corresponding to access priority of unit time)×(setting time of access priority to user−basic penalty of unsatisfied service level agreement)×(time of unsatisfied bandwidth agreement due to network resource shortage).

The basic concept of charging of the total use time of the user is similar to equation 1 of (i). The bandwidth basic fee is changed stepwise depending on the magnitude of the bandwidth allocated to the user.

[2] Second Embodiment

An embodiment in which a data center is configured using a high multiplex SMP server equipped with a partition function virtual computer function PRMF will be described.

Figure 17:
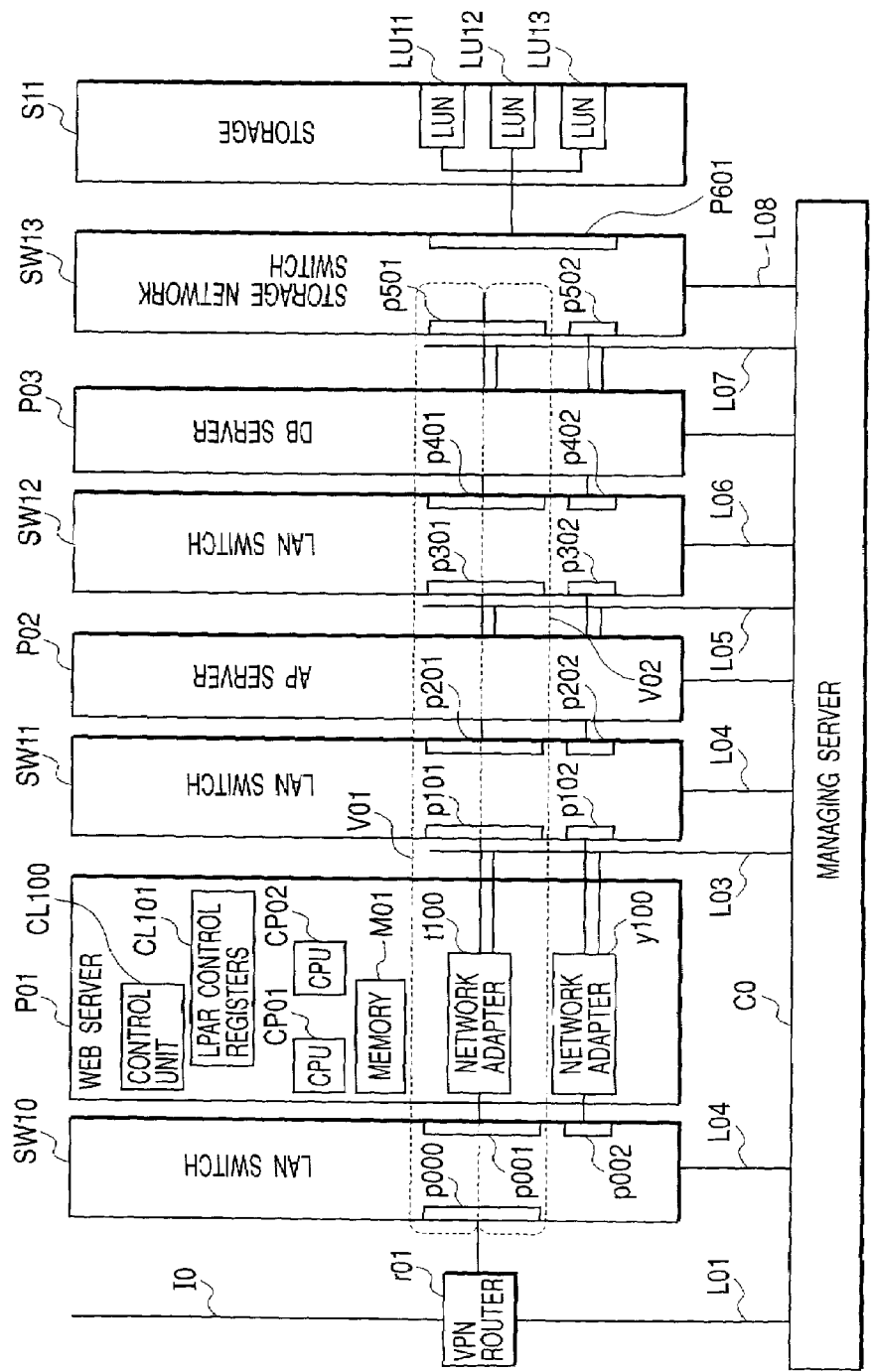
FIG. 17 is one example of the data center configuration using an LPAR server.
Figure 20:
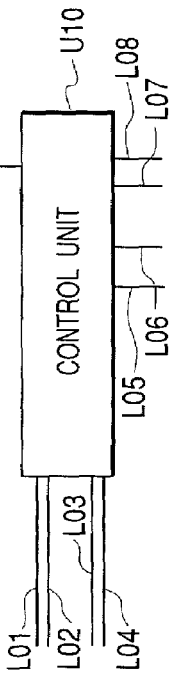
FIG. 20 is a list of VLAN-related information held by the data center managing server of FIG. 17.
Figure 22:
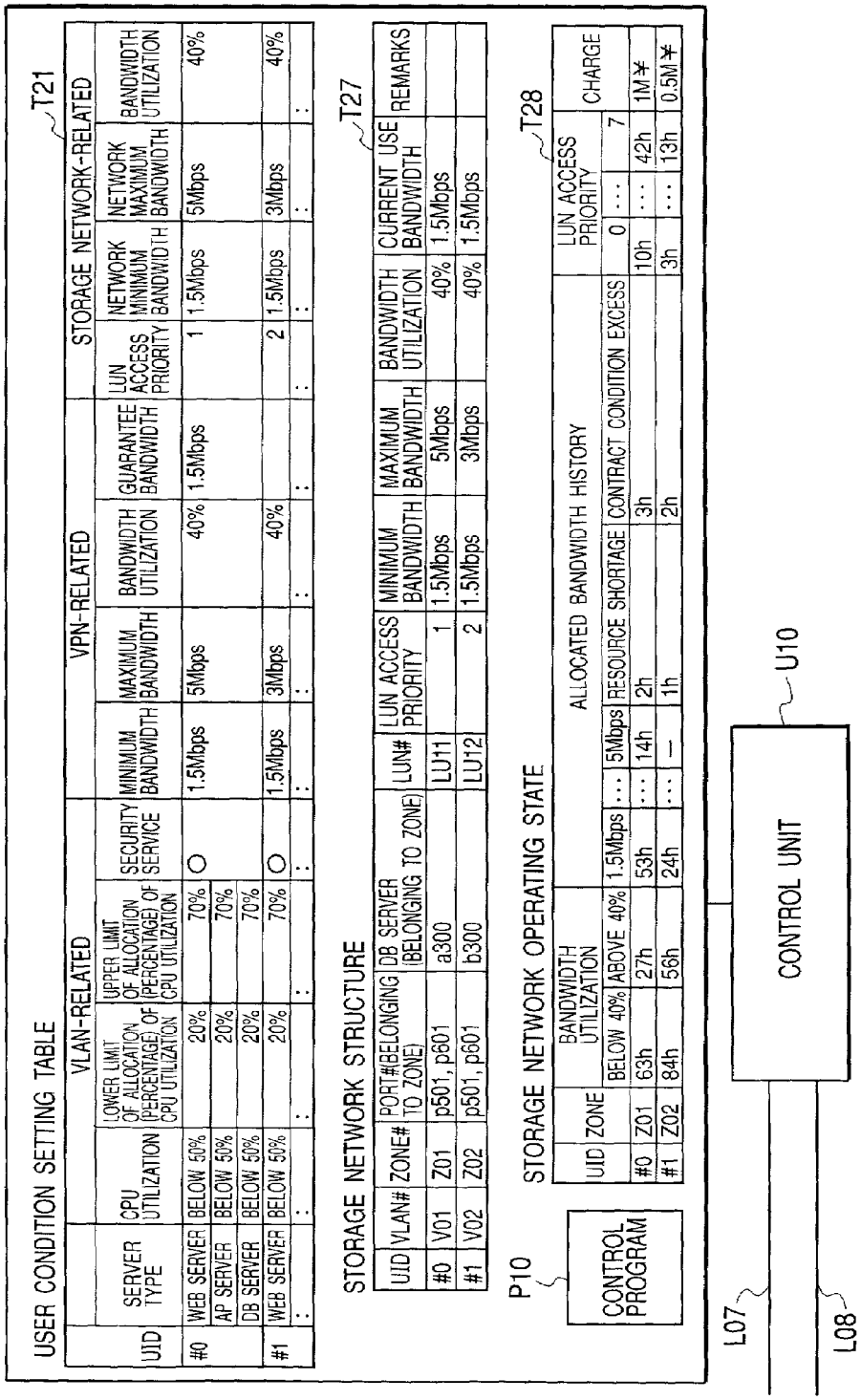
FIG. 22 is a list of storage network-related information held by the data center managing server of FIG. 17.
Figure 23:
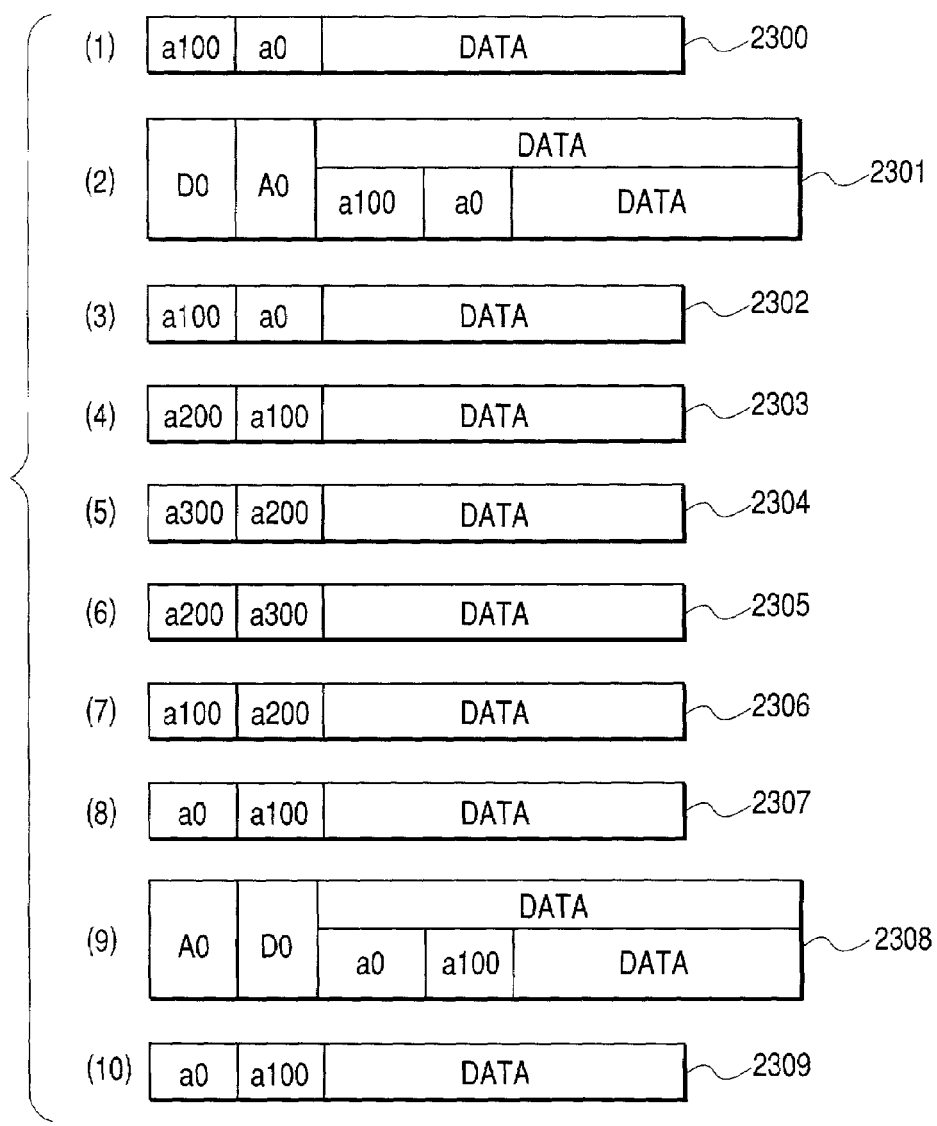
FIG. 23 is a list of packets processed in the data center of FIG. 17.
Figure 24:
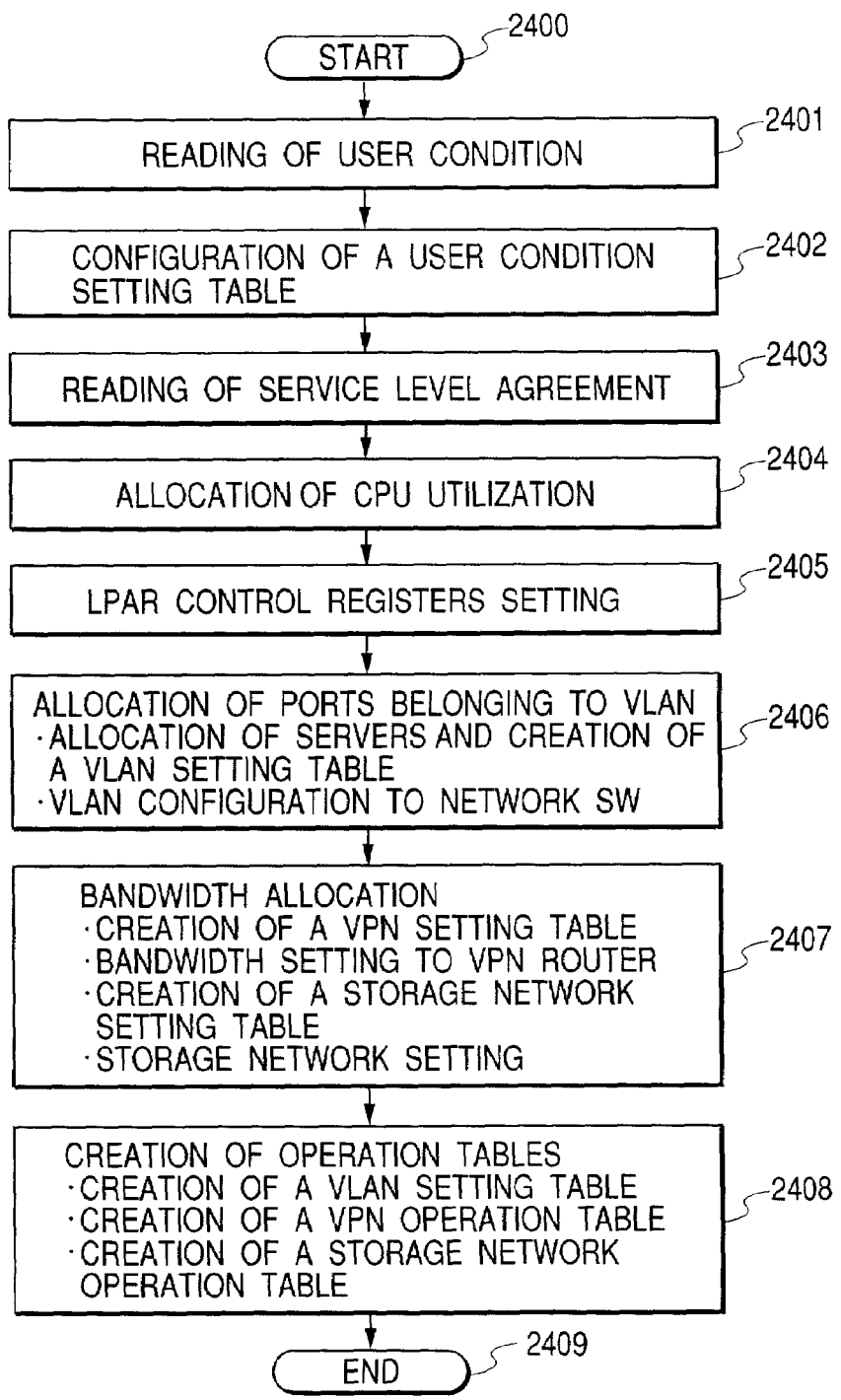
FIG. 24 is a flowchart of initial allocation of the LPAR, VLAN and VPN of the data center of FIG. 17.
Figure 25:
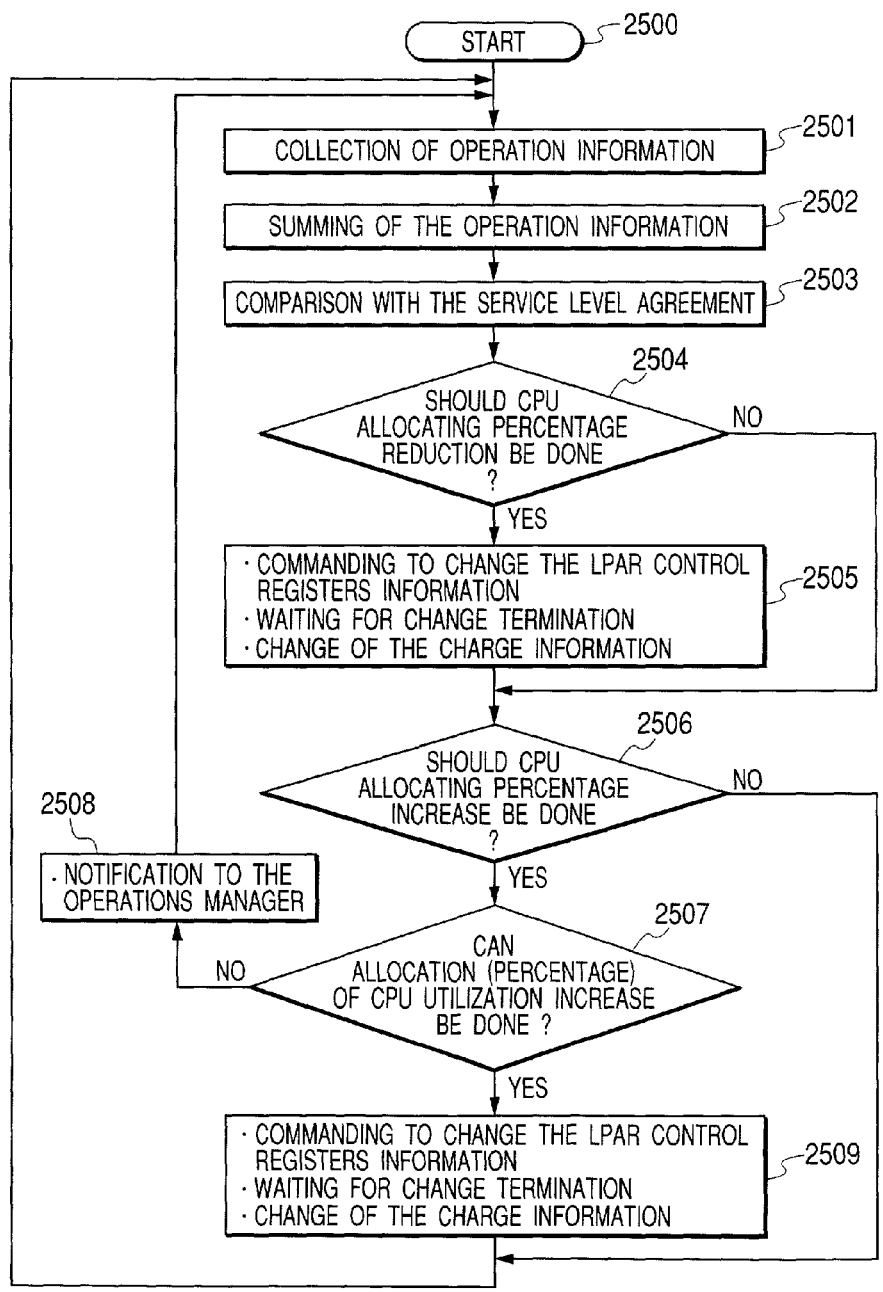
FIG. 25 is a flowchart of change of the allocation of CPU utilization to the user.

First, main drawings for describing the embodiment will be explained. FIG. 17 shows the internal configuration of a data center in the case of using an LPAR server. FIGS. 18 and 19 show one example of an input screen when the user company A makes a use agreement with this data center. FIG. 20 shows a list of VLAN-related information possessed by the managing server. FIG. 21 shows a list of VPN-related information possessed by the managing server. FIG. 22 shows a list of storage network-related information possessed by the managing server. FIG. 23 shows a list of packets used in the embodiment. FIG. 24 shows a procedure for allocating the CPU utilization of the server to the user who makes the agreement. FIG. 25 shows a procedure to dynamically increase and decrease the CPU utilization of the server allocated to the user.

The embodiment will now be described. The connection diagram of the data center to the user is similar to FIG. 1.

FIG. 17 shows the case of connecting one web server, one AP server and one DB server with the virtual computer function PRMF. The internal configurations of the AP server P02 and the DB server P03 are similar to that of the web server P01, and the description thereof is omitted.

FIGS. 18 and 19 are one example of the service level agreement input screen. This example is an agreement for the user company A to control the allocation of CPU utilization of all of the web server, AP server and DB server by the PRMF function to be always above 50%.

Back to FIG. 17, the web server P01 has a control unit CL100, an LPAR control register CL101, CPUs cP01 and CP02, a memory M01, and network adapters t100 and y100. The LPAR is an abbreviation of logical partition. The LPAR control register CL101 holds a dividing method of resources given to each OS.

As shown in FIG. 20, LPAR# is an identifier unifically given to each partition. One network adapter handles plural users. A network adapter address described later is configured by the control program P10 so as to correspond with an address input from each user on the service level agreement input screen of FIG. 19. The VLAN tugging technique can configure plural VLANs to one port. Plural addresses can be also configured for one network adapter. In FIG. 19, the user A has the web server address a100, the AP server address a200, and the DB server address a300. The user B is allocated the web server address b100, the AP server address b200, and the DB server address b300.

The coming-in user request packet is handed to the program on the OS of the corresponding LPAR. The allocation of CPU utilization column shows at what percentage the OS belonging to each LPAR and the program thereon are operated on the CPU. The control unit CL100 refers to this information to control the operating percentage of LPAR.

In this embodiment, the LPAR uniquely corresponds with the user identifier possessed by the data center managing server C0. PRMF control and VLAN configuration to the switch connected to the server prevent the resources from being shared between different users. The security between the users can be held. Communication from the user to the data center can be allowed only in the VLAN shown by the VLAN tag given to the packet by the VLAN tagging. Thus, the security from the user to the data center can be held.

Similar to the first embodiment, the case of transmitting the user request to the client a0→the web server a100→the AP server a200→the DB server a300→the AP server a200→the web server a100→the client a0 is considered. The client a0 generates a packet 2300 of FIG. 23(1). Similar to the first embodiment, a packet 2301 is generated by the VPN router A0 of FIG. 1 and a packet 2302 is generated by the VPN router D0. 049

The packet 2302 is handed to the network adapter t100 having the address a100 via the signal line L0 and is handed to the application program on LPAR#0, that is, the application program of the user A. This program generates a packet 2304 having the address a200 which is handed to the application program of the A company on the AP server P02 and the application program of the A company on the DB server P03. There are the addresses a100 and b100 on the network adapter t100 of the web server P01 which correspond with LPAR#0 and 1, respectively. (Although not shown, there are the addresses a200 and b200 on the network adapter t200 in the AP server P02 which correspond with LPAR#0 and 1 like the Web server. The LPAR#0 and 1 correspond with the users A and B. This is the same for the DB server P03). Similarly, a response from the DB server P03 to the AP server P02, web server P01 and client a0 can be executed by the application program on the LPAR correctly allocated to the A company. It is similar to the first embodiment, and the description thereof is not described in detail. The above operation sequentially generates the packets 2306 to 2309 of FIG. 23. If the client of the A company accesses the partition of the B company, VLANs belonging to the users A and B are different in the VLAN configuration table T22 of FIG. 20 to deny the access. The security for each user can be thus held. The case that there are plural users and one network adapter is given to each of the users is considered to be a modification of the VLAN part. In this case, a VLAN with respect to the port of the network switch is configured for each of the users via the network adapter of each of the users. The security can be thus held.

FIG. 20 is a diagram showing information of the server configuration and VLAN configuration possessed by the managing server C0. T22 is a VLAN configuration table which has the server column, network switch column, address column, and LPAR column and realizes configuration so as to belong to one VLAN for each user across plural network switches. A table T21 is a user condition setting table and has the contents of the columns of the upper limit and lower limit of the CPU utilization to each partition of the agreement inputted by the user on the service level agreement input screen and the threshold value of the CPU utilization agreed with the user. A table T23 of FIG. 20 is a server and VLAN operation table and information is inputted to the columns of allocated LPAR, a history of allocation of CPU utilization and an allocated CPU utilization history. Finally, a CPU allocation table T24 has as information the column of the allocation of CPU utilization currently allocated to each user. In this case, an agreement is made with the A company so that in any of the web server, AP server and DB server, the CPU utilization in the LPAR does not exceed 50% and the allocation of CPU utilization of the LPAR is changed within the range of 20% to 70%.

The control program P10 checks the monitoring result obtained from the signal lines L01 to L08 against the user condition setting table T21 of FIG. 20 to check whether the current resource allocation satisfies the service level agreement, thereby normalizing and storing the result into the column of the CPU utilization history of the server and VLAN operation table T23 of FIG. 20. For example, it records the CPU utilization history in the LPAR corresponding to the user #0. For this reason, the CPU allocation table T24 identifying the user and the allocation of CPU utilization is held. The CPU allocation table T24 holds the same contents as the column of allocation of CPU utilization of the LPAR control registers in the web server, AP server and DB server. The operation of the parameter information column related to charging of the server and VLAN operation table T23 is similar to the first embodiment.

To perform the above control, a procedure in which the control program P10 divides the resources will be described with FIG. 24.

First, information shown on the service level agreement input screen of FIGS. 18 and 19 is inputted to create a user condition setting table T21 (2401). Along information related to the minimum and maximum bandwidths and the bandwidth utilization, a VPN configuration table is created in the data center managing server, the user bandwidth managing server and the carrier bandwidth managing server. Information related to the minimum and maximum bandwidths and the bandwidth utilization is configured for the VPN router of the user, carrier and data center via the signal line L0 (2402).

Further, information shown on the service level agreement input screen of FIG. 19 is inputted to create the column of upper limit and lower limit of the allocation of CPU utilization, the column of the maximum and minimum bandwidths and the column of the user's bandwidth utilization of the user condition setting table T21 of FIG. 20, and the column of the network adapter of the VLAN configuration table T22 (2403).

Referring to the user condition setting table T21 of FIG. 20, that the allocation of CPU utilization of a minimum of 20% is performed to the user A and the allocation of CPU utilization of a minimum of 20% is performed to the user B is detected to create the column of the allocation of CPU utilization of the CPU allocation managing table T24 and the VLAN configuration table T22 (2404). The contents of the VLAN configuration table T22 are configured for the LPAR control registers in the servers P01, P02 and P03 of FIG. 17 via the signal lines L01 to L08 (2405). The storage-side port and the router-side port connected to the server are described into the column of port# of the VLAN configuration table T22 to provide a VLAN configuration command to the network switches SW10 to SW12 (2406). The network and storage network bandwidths are allocated and are described into the column of the bandwidth of the VPN configuration table T25 as shown in FIG. 21 and the column of the bandwidth of the storage network configuration table T27 as shown in FIG. 22, thereby providing a bandwidth configuration command to the VPN routers and the network switch SW13 (2407).

Based on the user condition setting table T21, the server and VLAN operation table T23 of FIG. 20, the VPN operation table T26 of FIG. 21, and the storage network operation table T28 of FIG. 22 are created (2408). Specifically, the columns to record the CPU utilization history and the network bandwidth utilization history to the user are created.

Information necessary for resource division control is generated and is configured for the VPN router r01, SW10 to SW13, and servers P01, P02 and P03. The system operation can be started in a state that the resources are divided correctly.

A procedure in which the control program P10 changes the partition allocation when a load is fluctuated will be described below with FIG. 25.

The operation information collection (2501), the operation information summing (2502), and comparison with the service level agreement (2503) are the same as the first embodiment. Whether the allocation of CPU utilization can be reduced is studied (2504). When it can be reduced, the contents of the LPAR control registers of the corresponding server are commanded to be changed. The judging method whether it can be reduced or not is the same as the first embodiment. After the change termination, the parameter related to charge is changed (2505). In this example, histories of the allocation of CPU utilization and allocation time are recorded. As one example of the charge calculation, it can be considered a method in which the use unit price per unit time is determined for the web server, AP server and DB server to charge the total of unit price×CPU utilization.

Whether the allocation of CPU utilization should be increased is studied (2506). When it must be increased, whether the allocation of CPU utilization configured for the corresponding server can be increased is checked (2507). When allocation can not be done, it is notified to the operations manager. An unsatisfied service level due to CPU ability shortage and an unsatisfied service level due to agreement excess are discriminated for recording (2508). The contents of the LPAR control registers of the corresponding server are commanded to be changed. After waiting for change termination, the parameter information related to charge is changed (2509).

The change is performed in the VPN and storage network depending on the operating state. The changing method is entirely the same as the first embodiment, and the description thereof is omitted.

Finally, charging will be described. The charging of the VPN and storage network are entirely the same as the first embodiment. Charging of the VLAN part is performed as follows:

(basic fee related to allocation of CPU utilization per unit time×allocation of CPU utilization to user×allocation time to user−basic penalty of allocation of CPU utilization per unit time of unsatisfied service level agreement×allocation of CPU utilization to user×time of unsatisfied service level agreement due to CPU resource shortage)×(weighting coefficient)

Here, the (weighting coefficient) is typically 1 and is a coefficient having a value larger than 1 when selecting the security service in FIG. 18.

[3] Modification of the First Embodiment (a) As a modification 1 of the first embodiment, it can be considered the case that the data center of FIG. 2 performs bandwidth allocation dynamic change and bandwidth guarantee related to the port bandwidth of the port of the network switches (SW01 to SW02) belonging to the user-dedicated VLAN. In such a case, it can be considered the case that the user VLAN traffic and other traffics of access from the Internet share the same switch port. The resource allocation dynamic change method and charging method in the operating state of the VPN part and the storage network part are entirely the same as the typical case of the first embodiment, and the description thereof is omitted.

Figure 29:
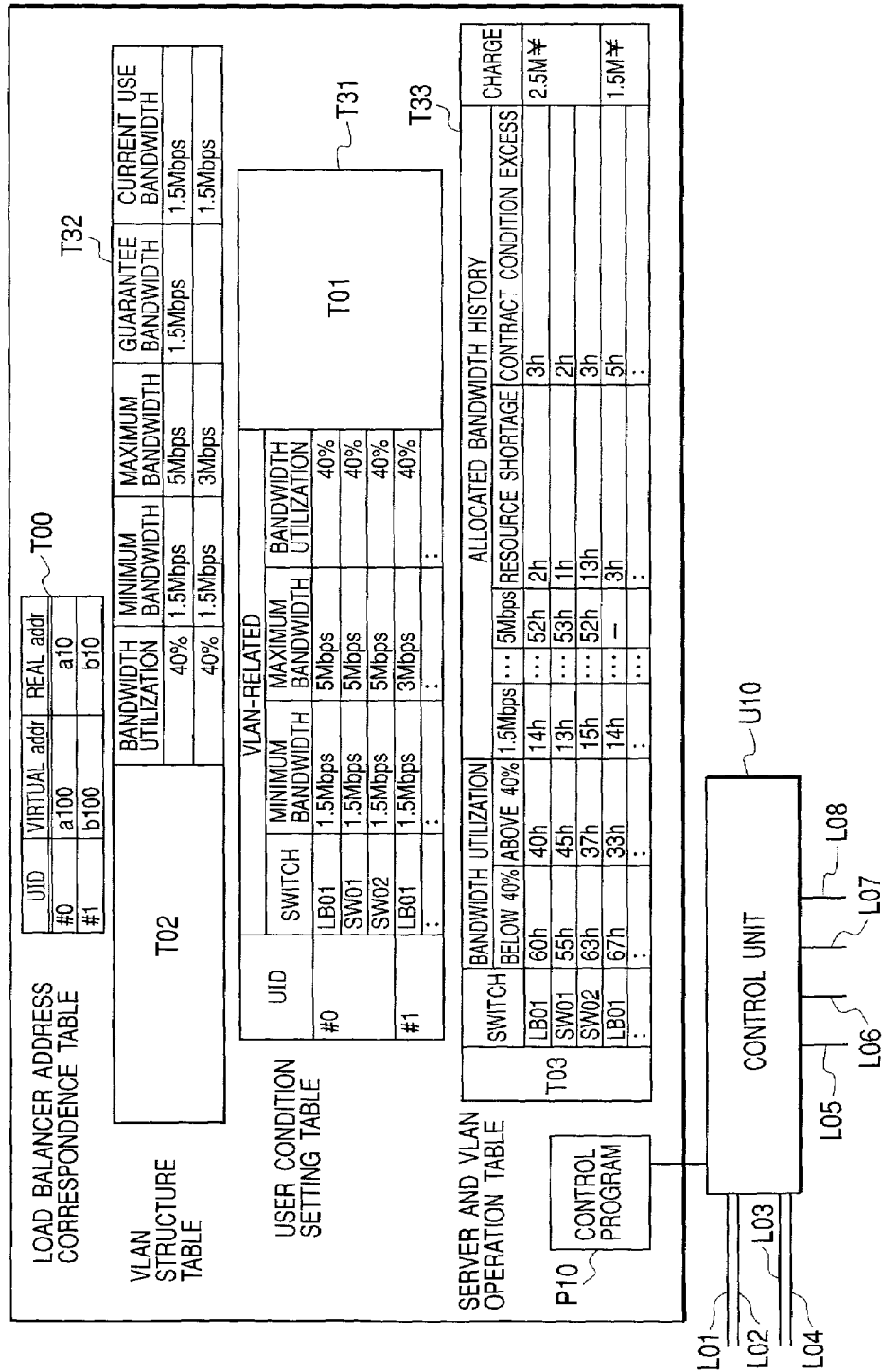
FIG. 29 is VLAN-related information possessed by the data center managing server of FIG. 2 in the case of having a network switch with a port bandwidth control function.

FIG. 29 is a diagram showing information of the VLAN part possessed by the managing server C0. The load balancer address correspondence table T00 has the same information of the typical case of the first embodiment. The characteristic point of this modification as information of the VLAN part possessed by the managing server C0 will be described with reference to FIG. 29. There is a table T31 which adds to the user condition setting table T01 of FIG. 6 the columns of the maximum and minimum allocated bandwidths and the threshold value of the bandwidth utilization of the load balancer LB01 and the network switches SW01 and SW02. There are also a VLAN configuration table T32 which adds to the VLAN configuration table T02 of FIG. 6 the columns of the maximum and minimum bandwidths and the threshold value of the bandwidth utilization of the LB01 and the network switches SW01 and SW02; and a VLAN configuration table T33 which adds to the server and VLAN operation table T03 of FIG. 6 the columns of the bandwidth utilization history of the LB01 and the network switches SW01 and SW02.

A method for changing server allocation when the system is started up will be described. A procedure for configuring a user-dedicated VLAN to the user is entirely the same as the typical case of first embodiment up to network switch port allocation to the VLAN. After port allocation to the user VLAN, following information of the columns of the maximum and minimum bandwidths and the bandwidth utilization of the user condition setting table T01 of FIG. 29 created along the contents configured on the service level agreement input screen of FIGS. 12 and 13, bandwidth allocation is performed to each of the ports allocated to the user-dedicated VLAN by entirely the same method as the VPN bandwidth allocating method. After bandwidth allocation to the port belonging to the VLAN, VPN configuration and storage network configuration are done to divide the resources.

A procedure in which the control program P10 of FIG. 29 changes server allocation when a load is increased will be described. In the flowchart of FIG. 16, the step up to 1603, that is, the step of operation information collection to comparison with the service level is the same as the typical embodiment. After comparison with the column of the bandwidth of the user condition setting table T01 of FIG. 29, the result is checked against the service level agreement to study whether network bandwidth reduction can be done. The data center managing server provides a bandwidth reduction request to the port bandwidth to be reduced. The bandwidth changing method is conducted in the order of the LB01 port, SW01 port and SW02 port in FIG. 2. (In the case of the user A, the bandwidth is changed in the order of p001, p101, p201, p301 and p401.) The step of 1604 to 1612 of FIG. 16 including change of the VLAN to the port connecting the server, the server deallocation process, and the server allocation process is the same as the typical embodiment. After server allocation and change of the VLAN to the port connecting the server, comparison with the column of the bandwidth of the user condition setting table T01 of FIG. 29 is done, and then, the result is checked against the service level agreement to study whether network bandwidth addition can be done. The data center managing server provides a bandwidth addition request to the port bandwidth to be added. The bandwidth changing method is done in the order of the SW02 port, SW01 port and LB01 port in FIG. 2. (In the case of the user A, the bandwidth is changed in the order of p501, p401, p301, p201, p101 and p001.) The process after that is entirely the same as the flowchart of FIG. 16.

Finally, charging of the VLAN part will be described. The charging to this modification adds an item of the bandwidth use to the charging of the VLAN part of the first embodiment and can be expressed as follows.

(basic fee of one server per unit time×the number of servers allocated to user×allocation time to user−basic penalty of unsatisfied service level agreement per unit time×the number of servers allocated to user×time of unsatisfied service level agreement due to server shortage)×(weighting coefficient 1)+(basic fee of bandwidth of network switch port per unit time ×allocation time to user−basic penalty of unsatisfied bandwidth agreement of network switch port×time of unsatisfied bandwidth agreement due to network resource)× (weighting coefficient 2)

The (weighting coefficient 1) is typically 1 and is a coefficient having a value larger than 1 when selecting the security service in FIG. 12. The (weighting coefficient 2) is typically 1 and is a coefficient having a value larger than 1 when selecting the bandwidth guarantee service in FIG. 12. The basic idea is the same as the typical case of the first embodiment.

The basic fee of the bandwidth of the network switch port is changed in steps depending on the magnitude of the bandwidth allocated stepwise to the user.

Figure 30:
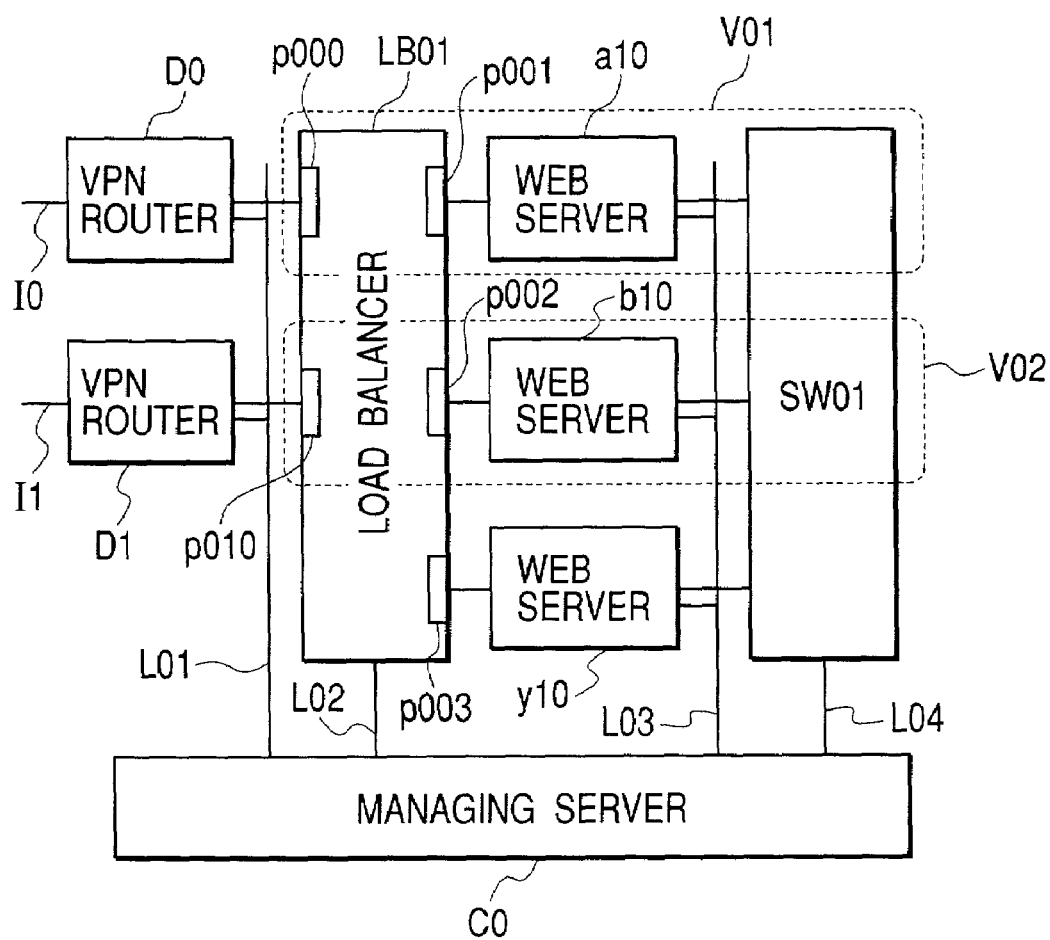
FIG. 30 is an example for holding security by combining the user-dedicated VPN router and VLAN without using VLAN tagging.

(b) As a modification 2 of the first embodiment, the configuration having the user-dedicated VPN router and port of the load balancer, as shown in FIG. 30, is possible. In the configuration of this embodiment, each user can be identified, not by the VLAN tagging iv technique, but by VLANID configured for the port of the user-dedicated VPN router and port of the load balancer. A series of operation is the same as the first embodiment.

Figure 32:
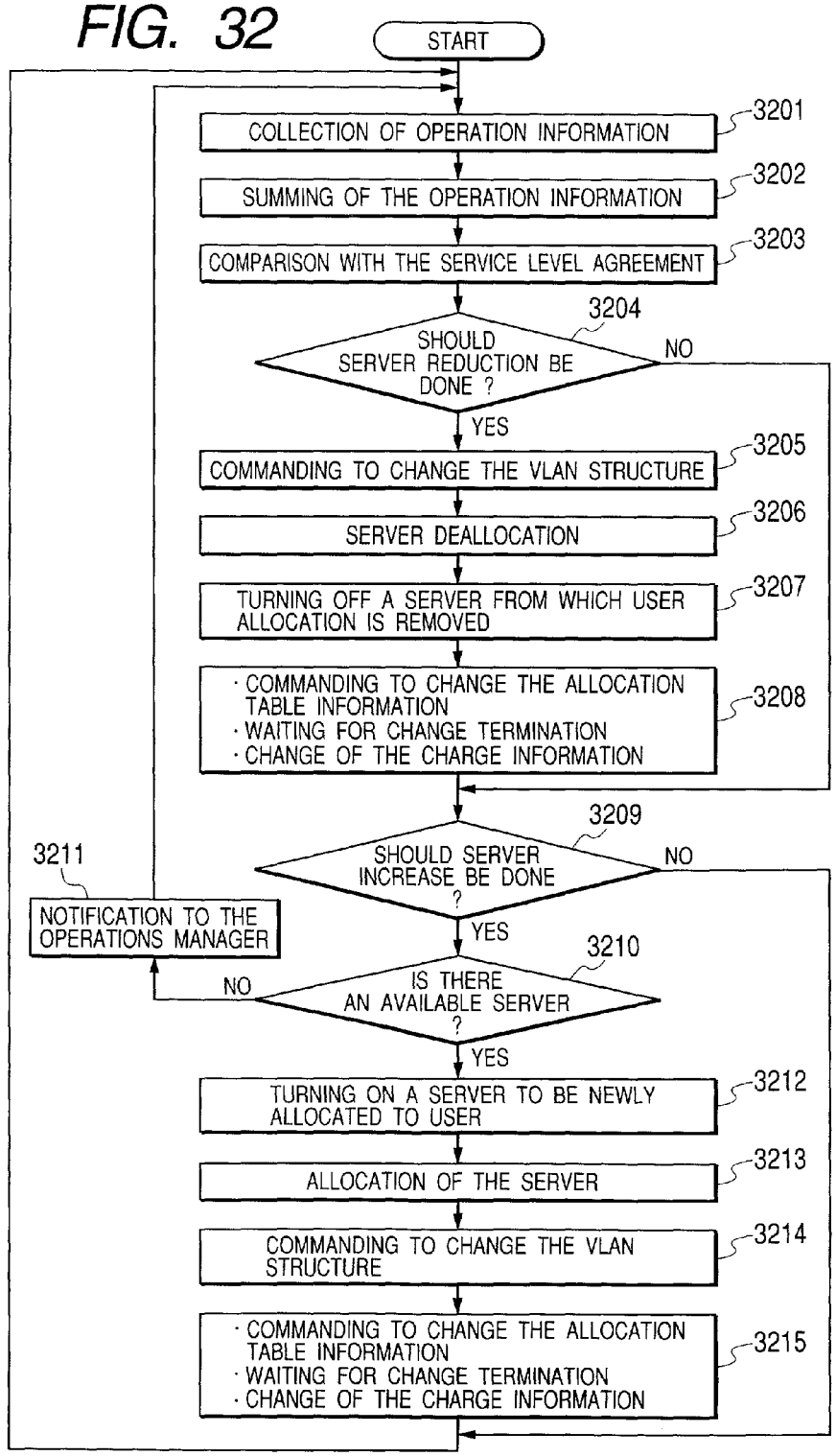
FIG. 32 is a flowchart of change of the server and VLAN allocation with power control.

(c) FIG. 32 shows a flow of change of server and VLAN allocation of a modification 3 of the first embodiment. In the data center of FIG. 2, there is a case of power control so as to turn on a server allocated when the server is allocated to the user and to turn off a server removed from the user allocation when the server is removed from the user. In this case, in comparison with FIG. 16 showing the flow making a server allocation change to the user, operation is done in accordance with FIG. 32 which adds a step (3212) for turning on the server allocated immediately before server allocation to the user and a step (3207) for turning off the server after removing the server allocation from the user. A series of operation other than two added steps is the same as the first embodiment.

[4] Modification of the Second Embodiment (a) As a modification of the second embodiment, there will be described the case that the data center of FIG. 17 performs bandwidth allocation dynamic change and bandwidth guarantee related to the port bandwidth of the port of the network switches (SW10 to SW12) belonging to the user-dedicated VLAN. The resource allocation dynamic change method and charging method by the operating state of the VPN part and the storage network part are entirely the same as the typical case of the first embodiment, and the description thereof is omitted.

Figure 31:
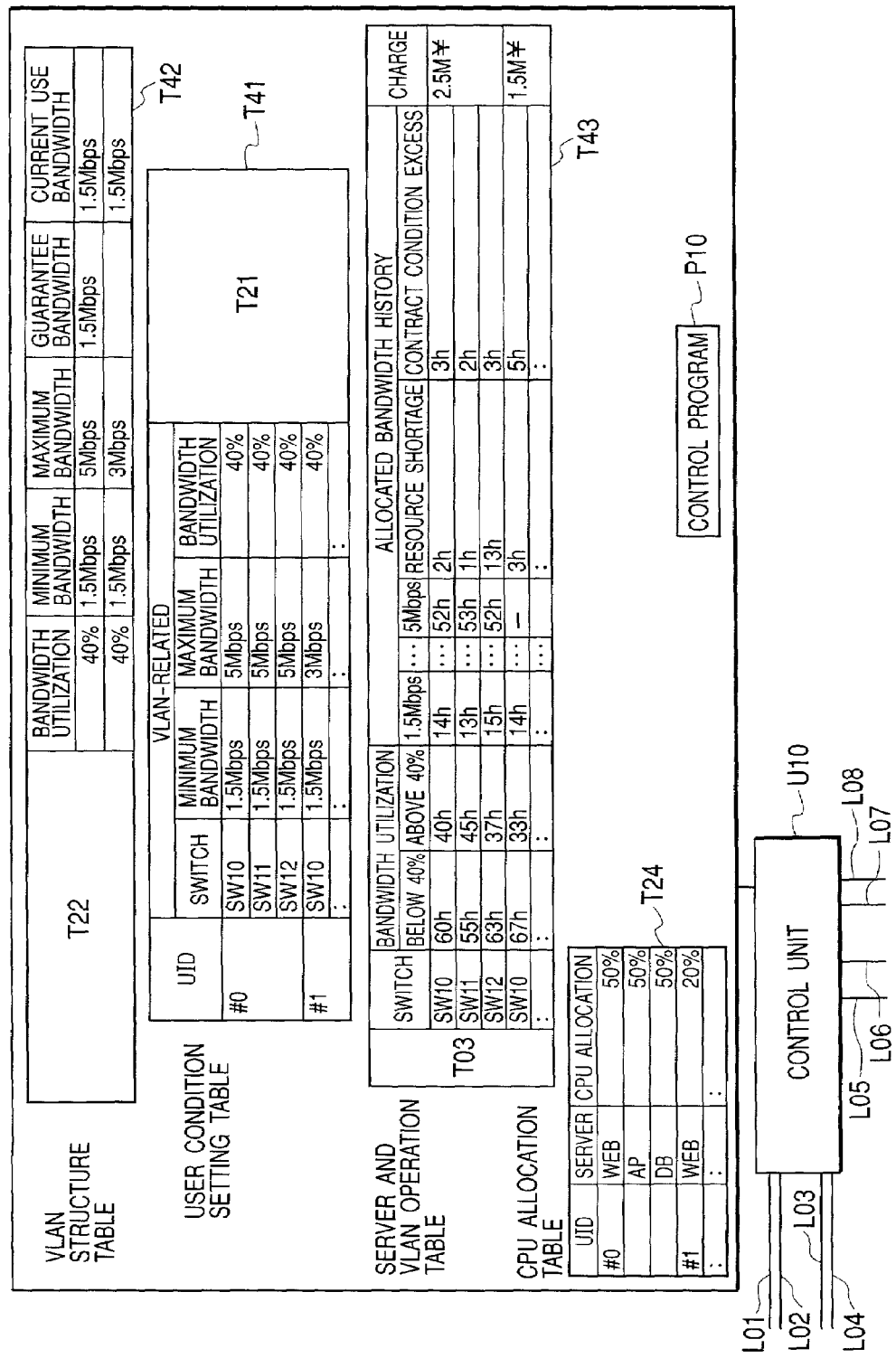
FIG. 31 is VLAN-related information possessed by the data center managing server of FIG. 17 in the case of having a network switch with a port bandwidth control function.

FIG. 31 is a diagram showing information of the VLAN part possessed by the managing server C0. The CPU allocation table T24 has the same as the typical case of the second embodiment. FIG. 31 has a user condition setting table T41 which adds to the user condition setting table T21 of FIG. 20 the columns of the maximum and minimum bandwidths and the bandwidth utilization of the SW10 and network switches SW11 and SW12; a VLAN configuration table T42 which adds to the VLAN configuration table T22 information of the columns of the maximum and minimum bandwidths and the bandwidth utilization of the SW10 and network switches SW11 and SW12; and a VLAN configuration table T43 which adds to the server and VLAN operation table T03 of FIG. 6 the column of a bandwidth utilization history of the SW10 and network switches SW11 and SW12.

A method for changing server allocation when the system is started up will be described. A procedure for configuring a user-dedicated VLAN is entirely the same as the typical case of second embodiment up to network switch port allocation to the VLAN. After port allocation to the user VLAN, following information of the columns of the maximum and minimum bandwidths and the bandwidth utilization of the user condition setting table T41 of FIG. 31 created along the contents configured on the service level agreement input screen of FIGS. 18 and 19, bandwidth allocation is performed to each of the ports allocated to the user-dedicated VLAN by entirely the same method as the VPN bandwidth allocating method. After bandwidth allocation to the port belonging to the VLAN, VPN configuration and storage network configuration are done to divide the resources.

A procedure in which the control program P10 of FIG. 31 changes server allocation when a load is increased will be described. In the flowchart of FIG. 25, the step up to 2503, that is, the step of operation information collection to comparison with the service level is the same as the typical embodiment. After comparison with the column of the bandwidth of the user condition setting table T21 of FIG. 31, the result is checked against the service level agreement to study whether network bandwidth reduction can be done. The data center managing server provides a bandwidth reduction request to the port bandwidth to be reduced. The bandwidth changing method is conducted in the order of the SW10 port, SW11 port and SW12 port in FIG. 17. (In the case of the user A, the bandwidth is changed in the order of p001, p101, p201, p301 and p401.) The step of 2504 to 2506 of FIG. 25 including the reduction process and the addition process of allocation of CPU utilization is the same as the typical embodiment. After adding allocation of CPU utilization, comparison with the column of the bandwidth of the user condition setting table T41 of FIG. 31 is done, and then, the result is checked against the service level agreement to study whether network bandwidth addition can be done. The data center managing server provides a bandwidth addition request to the port bandwidth to be added. The bandwidth changing method is done in the order of the SW12 port, SW11 port and LB10 port in FIG. 17. (In the case of the user A, the bandwidth is changed in the order of p501, p401, p301, p201, p101 and p001.) The process after that is entirely the same as the flowchart of FIG. 25. The column of the bandwidth utilization history of the server and VLAN operation table T43 is changed. The parameter related to charge is changed.

Finally, charging of the VLAN part will be described. The charging method of this modification adds an item of the bandwidth use to the charge of the VLAN part of the first embodiment and can be expressed as follows.

(basic fee of allocation of CPU utilization per unit time× allocation of CPU utilization to user×allocation time to user−basic penalty of unsatisfied service level agreement per unit time×allocation of CPU utilization to user×time of unsatisfied service level agreement due to CPU resource shortage)×(weighting coefficient 1)+(basic fee of bandwidth of network switch port per unit time×allocation time to user−basic penalty of unsatisfied bandwidth agreement of network switch port×time of unsatisfied service level due to network resource shortage)×(weighting coefficient 2)

The (weighting coefficient 1) is typically 1 and is a coefficient having a value larger than 1 when selecting the security service in FIG. 18. The (weighting coefficient 2) is typically 1 and is a coefficient having a value larger than 1 when selecting the bandwidth guarantee service in FIG. 18. The basic idea is the same as the typical case of the first embodiment.

The basic fee of the bandwidth in the network switch port is changed in steps depending on the magnitude of the bandwidth sit allocated stepwise to the user.

As described above, the present invention can give a network configuration table for each user company, give a network bandwidth and computer resources based on this, and automatically compares the monitoring result of the operating state of the network and computer with the service level agreement for each user to increase or decrease the amount of network resource and computer resource. This can change computer resource allocation in real time to abrupt load fluctuation the user company side cannot predict. In addition, the server of the user company is included in an independent VLAN to dynamically change the VLAN configuration according to server allocation, thereby holding security of each user. Further, network bandwidth dynamic configuration change copes with the increased network load of the data center so that the user can execute a necessary process without delay.

When the storage resources are shared by all the computers and the computer resource allocation is changed, the access right check based on the configuration of a VLAN and a storage network configured for each user is done. Security between the users can be maintained.

Furthermore, the present invention provides charging methods as defined by the following points:

1. A charging method to each user in a computer system having a plurality of computers interconnected by a local network, connected externally to the Internet, and connected to a storage and a storage network in which at least one of the plurality of computers is configured for division and allocation of each computer resource so as to form a plurality of logic partitions operated by independent OSs, including a step of changing at any time the computer resource allocation of each user according to comparison of a service level previously configured for each user with the operating state of the computer resource; a step of basing a charge based on the operating record of the computer resource of each user; and a step of charging an additional fee depending on the presence or absence of an agreement to hold security for each user by a VPN, VLAN and zoning as an option.

2. A charging method to each user in a computer system having a plurality of computers interconnected by a local network, connected externally to the Internet, and connected to a storage and a storage network in which at least one of the plurality of computers is configured for division and allocation of each computer resource so as to form a plurality of logic partitions operated by independent OSs, including a step of independently configuring a VPN for each user on the Internet to allocate a network bandwidth to each user; and a step of changing at any time the network bandwidth allocation of each user according to comparison of a service level previously configured for each user with the operating state of the network bandwidth and computing a charge based on the operating record.

3. In the charging method of point 2, an additional fee is charged to the use of the network bandwidth depending on the presence or absence of an agreement to guarantee the network bandwidth used by each user as an option.

4. The present invention also provides a computer resource allocating method for allocating servers to each user in a system having a plurality of servers interconnected by a local network, connected externally to the Internet, connected to a storage and a storage network, and processing a request of a plurality of users, which includes the steps of:
configuring a VPN to each user between a user exit, a carrier and the servers on the Internet and allocating a network bandwidth of each user;
dynamically changing according to a load a network bandwidth allocated to each user at the user exit, the carrier and the entry of servers; and
making an allocation change to a user who desires a bandwidth guarantee service at making an agreement in preference to other users.

The foregoing invention has been described in terms of the preferred embodiments and the above-mentioned points. However, those skilled in the art, will recognize that many variations of such embodiments exist. Such variations are intended to be within the scope of the present invention and the appended claims.

What is claimed is:

1. A computer resource allocating method, for allocating servers to each user in a computer system having a plurality of servers interconnected by a Local Area Network (LAN), connected externally to the Internet, connected to a storage and a storage network, and processing a request of a plurality of users, comprising:
configuring, for each user, a VLAN related to connection to servers allocated to the user and connection between the servers;
monitoring a load of each of the servers;
when making an allocation change of said servers of said user according to the monitoring result of said load, making a dynamic change of the VLAN of the user who changes allocation so that a computer allocated to each user is always included into the VLAN of the user;
configuring a VPN connecting the exit of a user and the entry of said computer system via a carrier on said Internet to each user;
monitoring at least a network load of the VPN configured for each user at the entry of said computer system;
making a change of the VPN configuration so as to change a network bandwidth according to the monitoring result of said load;
configuring zoning for each user by said storage network;
making an allocation of a storage access bandwidth resource to each user;
dynamically changing the storage network bandwidth and LUN access priority according to a load of the storage network of each user; and
wherein when a load to the network and server with respect to the resource divided to a user is increased, a change is made in the order of the resource allocation of the storage network part, the VLAN part configuration and the VPN part configuration.

2. The computer resource allocating method according to claim 1, wherein the change of the VPN part configuration is made in the order of the entry of said computer system, the carrier and the user.

3. The computer resource allocating method according to claim 1, wherein the change of the storage network configuration is made in the order of the LUN access priority and the storage network bandwidth.

4. A computer resource allocating method, for allocating servers to each user in a computer system having a plurality of servers interconnected by a local network, connected externally to the Internet, connected to a storage and a storage network, and processing a request of a plurality of users, comprising:
- configuring, for each user, a VLAN related to connection to servers allocated to the user and connection between the servers;
- monitoring a load of each of the servers;
- when making an allocation change of said servers of said user according to the monitoring result of said load, making a dynamic change of the VLAN of the user who changes allocation so that a computer allocated to each user is always included into the VLAN of the user;
- configuring a VPN connecting the exit of a user and the entry of said computer system via a carrier on said Internet to each user;
- monitoring at least a network load of the VPN configured for each user at the entry of said computer system;
- making a change of the VPN configuration so as to change a network bandwidth according to the monitoring result of said load;
- configuring zoning for each user by said storage network;
- making an allocation of a storage access bandwidth resource to each user;
- dynamically changing the storage network bandwidth and LUN access priority according to a load of the storage network of each user; and
- wherein when a load to the network and server with respect to the resource divided to a user is decreased, a change is made in the order of the VPN part configuration, the VLAN part configuration, and the resource allocation of the storage network part.

5. The computer resource allocating method according to claim 4, wherein the change of the VPN part configuration is made in the order of the user, the carrier and the entry of said computer system.

6. The computer resource allocating method according to claim 4, wherein the change of the storage network configuration is made stepwise in the order of the storage network bandwidth and the LUN access priority.

7. A computer resource allocating method for allocating servers to each user in a computer system having a plurality of servers interconnected by a local network, connected externally to the Internet, connected to a storage and a storage network, and processing a request of a plurality of users, comprising:
- configuring, for each user, a VLAN related to connection to servers allocated to the user and connection between the servers;
- monitoring a load of each of the servers;
- when making an allocation change of said servers of said user according to the monitoring result of said load, making a dynamic change of the VLAN of the user who changes allocation so that a computer allocated to each user is always included into the VLAN of the user; and
- wherein when making a server allocation change to a user in the case of increasing a load of the server with respect to the resource divided to the user, a server allocating process to the user is performed, and thereafter, a VLAN part changing process is performed stepwise in the order of the switch on the storage side and the switch of the entry of the servers.

* * * * *